(12) United States Patent
Mehta et al.

(10) Patent No.: US 7,292,965 B1
(45) Date of Patent: **\*Nov. 6, 2007**

(54) METHOD AND SYSTEM FOR ESTIMATING MANUFACTURING COSTS

(75) Inventors: Paul P. Mehta, Cincinnati, OH (US); Jerry William Evans, Middletown, OH (US); Arthur L. Ludwig, Hamilton, OH (US); Rahul Chhabra, Cincinnati, OH (US)

(73) Assignee: American Technology & Services, Inc., Cincinnati, OH (US)

( \* ) Notice: Subject to any disclaimer, the term of this patent is extended or adjusted under 35 U.S.C. 154(b) by 513 days.

This patent is subject to a terminal disclaimer.

(21) Appl. No.: 10/869,350

(22) Filed: Jun. 16, 2004

Related U.S. Application Data

(63) Continuation-in-part of application No. 09/517,023, filed on Mar. 2, 2000, now Pat. No. 6,775,647.

(51) Int. Cl.
*G06F 7/60* (2006.01)
*G06F 17/10* (2006.01)
*G06G 7/48* (2006.01)

(52) U.S. Cl. .............................. 703/2; 703/6
(58) Field of Classification Search .................... 703/7, 703/1, 2; 707/1, 2
See application file for complete search history.

(56) References Cited

U.S. PATENT DOCUMENTS

| 4,862,376 A | 8/1989 | Ferriter et al. |
| 4,887,206 A | 12/1989 | Natarajan |
| 5,063,506 A | 11/1991 | Brockwell et al. |
| 5,089,970 A | 2/1992 | Lee et al. |
| 5,109,337 A | 4/1992 | Ferriter et al. |
| 5,189,606 A | 2/1993 | Burns et al. |
| 5,249,120 A | 9/1993 | Foley |
| 5,255,207 A | 10/1993 | Cornwell |
| 5,268,838 A | 12/1993 | Ito |
| 5,521,814 A | 5/1996 | Teran et al. |
| 5,546,564 A | 8/1996 | Horie |

(Continued)

OTHER PUBLICATIONS

*Determining the Affordability of Advanced Propulsion Systems*, Paul P. Mehta, Jerry W. Evans, Arthur L. Ludwig, Jun. 7-10, 1999.

(Continued)

*Primary Examiner*—Kamini Shah
*Assistant Examiner*—David Silver
(74) *Attorney, Agent, or Firm*—Dinsmore & Shohl LLP

(57) ABSTRACT

A method and system estimates manufacturing costs for conventional and advanced materials and processes based on process-oriented approach. A computer system input display for selecting one or more designs and one or more design parameters. Cost models are based upon process-oriented manufacturing cost estimates for a plurality of designs utilizing materials and manufacturing processes. Software is programmed to receive selected designs and selected design parameters from the input display and pass the selected designs and design parameters to the cost models. An output display shows the manufacturing costs estimated by the cost models for the selected designs and design parameters. A manufacturing process flow simulation model highlights and quantifies the magnitude of the manufacturing process cost drivers. An architecture including a relational database is also disclosed, and input and editing modules can be utilized to modify the cost model equations or to provide input from other software applications.

7 Claims, 21 Drawing Sheets

U.S. PATENT DOCUMENTS

| | | | |
|---|---|---|---|
| 5,576,965 | A | 11/1996 | Akasaka et al. |
| 5,655,087 | A | 8/1997 | Hino et al. |
| 5,717,595 | A | 2/1998 | Cherrington et al. |
| 5,737,227 | A | 4/1998 | Greenfield et al. |
| 5,748,943 | A | 5/1998 | Kaepp et al. |
| 5,793,632 | A | 8/1998 | Fad et al. |
| 5,880,959 | A | 3/1999 | Shah et al. |
| 5,893,082 | A | 4/1999 | McCormick |
| 5,914,887 | A | 6/1999 | Scepanovic et al. |
| 6,037,945 | A | 3/2000 | Loveland |
| 6,157,900 | A | 12/2000 | Maseeh |
| 6,578,024 | B2 * | 6/2003 | Kuypers ............ 707/1 |
| 6,618,719 | B1 * | 9/2003 | Andrei ............ 707/2 |
| 6,775,647 | B1 * | 8/2004 | Evans et al. ............ 703/7 |
| 6,912,533 | B1 * | 6/2005 | Hornick ............ 707/10 |
| 2003/0225768 | A1 * | 12/2003 | Chaudhuri et al. ............ 707/10 |
| 2004/0181378 | A1 * | 9/2004 | Gilmore ............ 703/6 |

OTHER PUBLICATIONS

Leibl et al, "Cost Calculation with a Feature-based CAD System using Modules for Calculation, Comparison and Forecast", Journal of Engineering Design, vol. 10 No. 1, pp. 93-102 (Mar. 1999).

Anderson et al, "Designing Quality into Products: The Use of Accounting Data in New Product Development", Accounting Horizons, vol. 12 No. 3, pp. 213-233 (Sep. 1998).

Hertenstein et al, "Why Product Development Teams Need Management Accountants", Management Accounting, vol. 79 No. 10, pp. 50-55 (Apr. 1998).

Veeramani et al, "Methodologies for Rapid and Effective Response to Requests for Quotation (RFQs)", IIE Transactions, vol. 29 No. 10, pp. 825-838 (Oct. 1997).

* cited by examiner

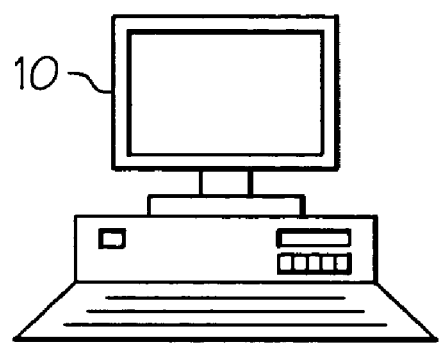
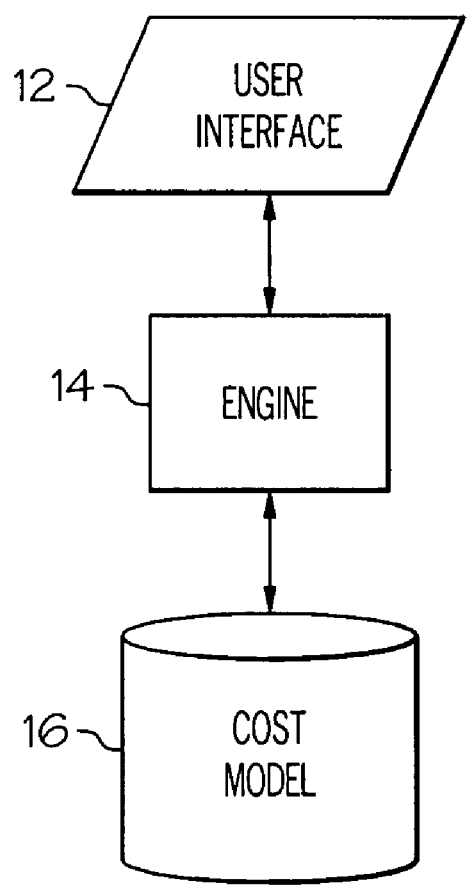
FIG. 1

Integrated OGV / Diffuser - Single passage

Two-piece, OGV Ring / Diffuser - Single passage

Integrated OGV / Diffuser - Tri-passage

Two-piece, OGV Ring / Diffuser - Tri-passage

Integrated OGV / Diffuser - Quad passage

Two-piece, OGV Ring / Diffuser - Quad passage

SHAFT FORGING

AREA = 20.1 SQ. IN.

C.G. = 7.6 IN. RAD.

VOL. = 1001.4 CU. IN.

WEIGHT = 137 LBS.

7.6"

| | Routing | | | | | | |
|---|---|---|---|---|---|---|---|
| File | Edit | Options | Data | Defaults | Window | Help | |

97-8

Part No. 97-8  History Wednesday April 09 1997

Work Order  Lot Size 10  Cost 40575.90153

| No | Workstation | Description | N | Setup Time | Run Time |
|---|---|---|---|---|---|
| 10 | GIDDINGS & LEWIS 30" | Turn LPT Shaft to sonic envelope dimensions | N | 0.7500 | 576.4497 |
| 20 | WORK BENCH -1 | Clean and Deburr shaft | | | 35.1633 |
| 25 | INSP STATION | Ultrasonic inspect forging | | 0.2500 | 24.9000 |
| 30 | GIDDINGS & LEWIS 30" | Turn LPT Shaft to finished contour | | 0.9167 | 105.1298 |
| 35 | WORK BENCH -1 | Clean and Deburr disk | | | 33.0817 |
| 40 | MILICRON 15HC | Drill and Ream bolt circle (forward flange) | | 2.0833 | 25.0998 |
| 45 | MILICRON 15HC | Mill scallops in forward flange | | 1.2500 | 28.6234 |
| 47 | MILICRON 15HC | Drill and Ream bolt circle (aft flange) | | 2.0833 | 32.5198 |
| 50 | MILICRON 15HC | Mill scallops in forward flange | | 1.2500 | 28.6234 |
| 55 | WORK BENCH -1 | Clean and Deburr holes and scallops | | | 31.4533 |
| 60 | 155-13040-NOT | Flourescent Panetrant inspection | | 1.0000 | 2.3833 |
| 65 | HEAT TREAT | Heat Treat operation for stress relieve | | | 17.5000 |
| 70 | GRIT BLASTER -1 | Degrease and Grit Blast part after heat treating | | 0.2500 | 12.5817 |
| 80 | CMM -1 | Dimensional inspection | | 1.0000 | 38.1000 |
| 85 | CMM -1 | Eddy current inspection of part features | | 1.0000 | 21.6000 |
| | | | | 11.833 | 1021.1087 |

FIG. 11

| Process Opn No | Table Number | Process Description | Table Time | Adjustment Factor | Cycle Minutes | Setup Hours |
|---|---|---|---|---|---|---|
| 20.2 Deburr | 18.5.S | Setup (per part) | 0.05 | 1 | | 0.05 |
| | 1.1.1B | Sling, hoist, move | 3.38 | 1 | 3.38 | |
| | 18.5.1 | Handling, repos. | 0.38 | 8 | 3.04 | |
| | 18.5.2 | Tool handling | 0.03 | 8 | 0.24 | |
| | 18.5.4B | File edge | 1.50 | 30 | 45.00 | |
| | 18.5.6 | Blow-off | .26 | 6 | 1.56 | |
| | 18.5.1 | Handling, repos. | .38 | 8 | 3.04 | |
| | 18.5.8 | Sand / Hand Polish | 8.12 | 15 | 121.80 | |
| | 18.5.6 | Blow-off | 0.26 | 6 | 1.56 | |
| | 1.1.1B | Sling, hoist, move | 3.38 | 1 | 3.38 | |
| Total Lot Hours: | | | 3.10 | | 183.00 | 0.05 |

FIG. 13

Part Name: 11311 - Diffuser    WBS Number: 11311    Material: IN-718    Mat. Cost: $67,320
Input Mat. Form: Casting    Input Weight: 599    Finished Weight: 521.5    Service Cost: 0
Labor Rate: $25.69    Burden Rate: $77.07    Total Hours: 129.72    Variance: 20%    Lbr. Cost: $15,996.28
Unit: 250th in 2014    Year $: 1990    Lot Size: 10    *Total Manufacturing Cost:* $83,316.28

| Operation Number | Description | Hrs. / Part |
|---|---|---|
| 10 | Finish Turn combuster burner | 17.66 |
| 20 | Clean and Deburr | 7.04 |
| 25 | Drill holes in aft inner flanges, 96 @ 0.34" dia. | 6.52 |
| 30 | Drill holes in outer flange, 90 @ 0.43" dia. | 4.70 |
| 35 | Drill holes in forward inner flange, 54 @ 0.25" dia. | 2.98 |
| 40 | Clean Diffuser | 1.60 |
| 45 | Deburr holes, 90@.43", 96@.34", and 54@.25" dia. | 2.59 |
| 50 | EDM slots for OGV's | 3.90 |
| 55 | Clean and Deburr slots | 9.05 |
| 60 | Fixture, Locate vanes, Apply alloy and Braze | 27.29 |
| 70 | Clean part & polish vanes at flowpath | 6.42 |
| 80 | Dimensional Inspect | 12.23 |
| 90 | Final Inspect. | 4.14 |
| 11249 | Outlet Guide Vanes - to braze in place | 23.60 |
| | | 0.00 |

FIG. 14

| Part Name | Finished Weight | Alloy | Casting Cost 1999 $ | Quantity multiplier | Total Input Material Cost 1999$ | Labor Hours | Total Manufacturing Cost 1999$ |
|---|---|---|---|---|---|---|---|
| Diffuser (integrated), Mod 1 | 450 | IN-718 | $ 50,000 | 1 | $ 50,000 | 110 | $ 63,814 |
| Diffuser (integrated), Mod 1 | 310 | TiAl | $ 100,000 | 1 | $ 100,000 | 160 | $ 119,980 |
| Diffuser (integrated), Mod 1 | 400 | IN-625 | $ 50,000 | 1 | $ 50,000 | 135 | $ 66,897 |
| Diffuser (integrated), Mod 3 | 175 | IN-718 | $ 35,000 | 1 | $ 35,000 | 126 | $ 50,638 |
| Diffuser (integrated), Mod 3 | 145 | TiAl | $ 65,000 | 1 | $ 65,000 | 115 | $ 79,282 |
| Diffuser (integrated), Mod 3 | 405 | IN-625 | $ 30,000 | 1 | $ 30,000 | 139 | $ 47,241 |
| Diffuser (integrated), Mod 4 | 250 | IN-718 | $ 35,000 | 1 | $ 35,000 | 150 | $ 53,598 |
| Diffuser (integrated), Mod 4 | 125 | TiAl | $ 75,000 | 1 | $ 75,000 | 120 | $ 89,897 |
| Diffuser (integrated), Mod 4 | 375 | IN-625 | $ 40,000 | 1 | $ 40,000 | 100 | $ 52,432 |
| Indv. varies | 45 | IN-718 | $ 100 | 150 | $ 15,000 | 31 | $ 18,823 |
| Indv. varies | 25 | TiAl | $ 200 | 150 | $ 30,000 | 31 | $ 33,823 |
| Indv. varies | 36 | IN-625 | $ 200 | 150 | $ 30,000 | 31 | $ 33,823 |
| Ingegrated OGV / Diffuser Assembly, Mod 1 | | IN-718 | $ 65,000 | 1 | $ 65,100 | 141 | $ 82,487 |
| Ingegrated OGV / Diffuser Assembly, Mod 1 | | TiAl | $ 130,000 | 1 | $ 130,100 | 191 | $ 153,653 |
| Ingegrated OGV / Diffuser Assembly, Mod 1 | | IN-625 | $ 80,000 | 1 | $ 80,100 | 166 | $ 100,570 |
| Ingegrated OGV / Diffuser Assembly, Mod 3 | | IN-718 | $ 50,000 | 1 | $ 50,100 | 157 | $ 69,460 |
| Ingegrated OGV / Diffuser Assembly, Mod 3 | | TiAl | $ 95,000 | 1 | $ 95,100 | 148 | $ 113,104 |
| Ingegrated OGV / Diffuser Assembly, Mod 3 | | IN-625 | $ 60,000 | 1 | $ 60,100 | 170 | $ 81,063 |
| Ingegrated OGV / Diffuser Assembly, Mod 4 | | IN-718 | $ 50,000 | 1 | $ 50,100 | 181 | $ 72,419 |
| Ingegrated OGV / Diffuser Assembly, Mod 4 | | TiAl | $ 105,000 | 1 | $ 105,100 | 151 | $ 123,720 |
| Ingegrated OGV / Diffuser Assembly, Mod 4 | | IN-625 | $ 70,000 | 1 | $ 70,100 | 131 | $ 86,254 |

FIG. 15

| Part Name | Finished Weight | Alloy | Total Input Material Cost 1999$ | Labor Hours | Total Manufacturing Cost 1999$ |
|---|---|---|---|---|---|
| Forward Segment, Mod 1 | 250 | IN-718 | $ 18,750 | 35 | $ 23,066 |
| Forward Segment | 175 | IN-718 | $ 39,375 | 75 | $ 48,623 |
| Forward Segment | 380 | TiAl | $ 13,300 | 40 | $ 18,232 |
| Aft Segment, Mod 1 | 210 | IN-718 | $ 15,750 | 30 | $ 19,449 |
| Aft Segment | 105 | TiAl | $ 23,625 | 20 | $ 26,091 |
| Aft Segment | 120 | IN-625 | $ 4,200 | 40 | $ 9,132 |
| Diffuser (2-piece), Mod 1 | 460 | IN-718 | $ 34,500 | 36 | $ 46,955 |
| Diffuser (2-piece), Mod 1 | 280 | TiAl | $ 63,000 | 25 | $ 77,797 |
| Diffuser (2-piece), Mod 1 | 500 | IN-625 | $ 17,500 | 37 | $ 31,928 |
| Forward Segment, Mod 3 | 210 | IN-718 | $ 15,750 | 50 | $ 21,916 |
| Forward Segment | 125 | IN-718 | $ 28,125 | 30 | $ 31,824 |
| Forward Segment | 275 | TiAl | $ 9,625 | 27 | $ 12,954 |
| Aft Segment, Mod 3 | 48 | IN-718 | $ 3,600 | 32 | $ 7,546 |
| Aft Segment | 120 | TiAl | $ 24,000 | 45 | $ 29,549 |
| Aft Segment | 150 | IN-625 | $ 5,250 | 75 | $ 14,498 |
| Diffuser (2-piece), Mod 3 | 258 | IN-718 | $ 19,350 | 56 | $ 36,367 |
| Diffuser (2-piece), Mod 3 | 245 | TiAl | $ 52,125 | 10 | $ 62,607 |
| Diffuser (2-piece), Mod 3 | 425 | IN-625 | $ 14,875 | 8 | $ 28,410 |
| Forward Segment, Mod 4 | 300 | IN-718 | $ 16,073 | 60 | $ 23,472 |
| Forward Segment | 110 | TIAl | $ 22,635 | 45 | $ 28,184 |
| Forward Segment | 175 | IN-625 | $ 7,683 | 30 | $ 11,382 |
| Aft Segment, Mod 4 | 50 | IN-718 | $ 7,703 | 35 | $ 12,019 |
| Aft Segment | 85 | TiAl | $ 10,709 | 25 | $ 13,792 |
| Aft Segment | 120 | IN-625 | $ 2,679 | 15 | $ 4,529 |
| Diffuser (2-piece), Mod 4 | 350 | IN-718 | $ 23,776 | 15 | $ 37,340 |
| Diffuser (2-piece), Mod 4 | 195 | TiAl | $ 33,344 | 15 | $ 43,826 |
| Diffuser (2-piece), Mod 4 | 295 | IN-625 | $ 10,362 | 15 | $ 17,761 |
| Outlet Guide Vane, Complete Ring | 75 | IN-718 | $ 3,053 | 25 | $ 6,136 |
| Outlet Guide Vane, Complete Ring | 55 | TiAl | $ 4275 | 25 | $ 7,358 |
| Outlet Guide Vane, Complete Ring | 62 | IN-625 | $ 1,556 | 25 | $ 4,639 |
| OGV Ring / Diffuser Assembly, Mod. 1 | 535 | IN-718 | $ 37,553 | 126 | $ 53,090 |
| OGV Ring / Diffuser Assembly, Mod. 1 | 335 | TiAl | $ 67,275 | 145 | $ 85,155 |
| OGV Ring / Diffuser Assembly, Mod. 1 | 562 | IN-625 | $ 19,056 | 142 | $ 36,566 |
| OGV Ring / Diffuser Assembly, Mod. 3 | 333 | IN-718 | $ 22,403 | 163 | $ 42,503 |
| OGV Ring / Diffuser Assembly, Mod. 3 | 300 | TiAl | $ 56,400 | 110 | $ 69,964 |
| OGV Ring / Diffuser Assembly, Mod. 3 | 487 | IN-625 | $ 16,431 | 135 | $ 33,049 |
| OGV Ring / Diffuser Assembly, Mod. 4 | 425 | IN-718 | $ 26,829 | 135 | $ 43,476 |
| OGV Ring / Diffuser Assembly, Mod. 4 | 250 | TiAl | $ 37,619 | 110 | $ 51,183 |
| OGV Ring / Diffuser Assembly, Mod. 4 | 357 | IN-625 | $ 11,918 | 85 | $ 22,400 |

FIG. 16

DIFFUSER MODEL - (MAKE CHANGES TO THE DIFFUSER)

Diffuser Weight (lbs.): 385

Axial Length (in.): 20.5833

Diameter (in.): 43.9182

Calculate Mfg Cost

Mfg Cost Drivers

Sub-Compact View

Sectional View

ATS Proprietary

FIG. 20

Engine Cost Assessment Program

Part Name: <u>Integrated Diffuser</u>

Input Material Form: <u>Casting</u>

Input Material Parameters

Material:                              IN-718
    Input weight:                     350 lb Finished Part Parameters Design:                           One Piece
    Number of Passages:           4
    Max. Outer Diameter:        36.00 in
    Axial Length:                  15.00 in
    Finished Weight:            250.00 lb

---

Manufacturing Cost Output for 250th Part (in 1999 Dollars)

| | | | |
|---|---|---|---|
| Material Cost: | | | $50,000.00 |
| Labor Cost: | | | $22,419.00 |
| | Labor Hours: | 150.00 | |
| | Labor Rate: | $25.69/ hr | |
| | Burden Rate: | $77.07/ hr | |
| | Variance: | 20 % | |
| Manufacturing Cost: | | | $72,419.00 |

FIG. 21

METHOD AND SYSTEM FOR ESTIMATING MANUFACTURING COSTS

CROSS-REFERENCE TO RELATED APPLICATION

The present application is a continuation-in-part of U.S. patent application Ser. No. 09/517,023 filed Mar. 2, 2000 now U.S. Pat. No. 6,775,647, the entire disclosure of which is hereby incorporated herein by reference.

COPYRIGHTS PRESERVED

A portion of the disclosure of this patent document contains subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to the design and manufacturing of parts, and will be specifically disclosed as a method and system for estimating manufacturing costs during the early design stage.

BACKGROUND OF THE INVENTION

Technology is needed that successfully connects design engineering with production technology, especially in the area of advanced materials and processes. Design engineers need an automated way to evaluate the cost of producing parts or components they design. Normally, a manufacturing engineer has to conduct a cost evaluation as a separate exercise. In the absence of manufacturing data on materials and processes, the engineer normally uses a complexity factor on an older part performing the same or similar function. This technique is arbitrary, lacking a scientific basis for estimating cost. Some computer programs, such as PriceH (a commercially available system from Lockheed-Martin) and Compeat (proprietary to General Electric Aircraft Engines "GEAE"), exist and are based on comparative/parametric estimating, requiring historical data. However, such approaches are deficient for advanced materials and processes where there is little or no historical data, or where the historical data is drastically different than the desired materials or processes. Moreover, manufacturing data on advanced materials and processes is hard to find, and the limited data available is often misleading if projected to maturity without manufacturing technology assessment. Furthermore, the above programs do not successfully link with the knowledge base of design engineering, making them awkward to use. Since the prior techniques for estimating costs are often deficient, engineers typically ignore the eventual cost of manufacturing, leaving it for the production department to control the cost. Moreover, prior techniques can be deficient in considering manufacturing processes, and can be difficult to upgrade, expand or modify.

SUMMARY

Accordingly, an object of the invention is to provide a method and system of estimating manufacturing costs aimed primarily at, but not limited to, the design community. Such methods and systems that are process-oriented and focus on the manufacturing processes to be conducted are also desired. In addition, such methods and systems that are flexible and easily expandable and modifiable are desired.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One aspect of the present invention is a computer system. An input is adapted for selecting one or more designs and one or more design parameters. One or more cost models are based upon process-oriented manufacturing cost estimates for a plurality of designs utilizing materials or processes. The cost models are operative to estimate manufacturing costs. Software is programmed to receive selected designs and selected design parameters from the input display and pass the selected designs and design parameters to the cost models. An output display shows the manufacturing costs estimated by the cost model for the selected designs and design parameters.

According to another aspect, a computer system is provided comprising an input display for selecting one or more designs and one or more design parameters, and one or more cost models, the cost models being based upon process-oriented manufacturing cost estimates for a plurality of designs, and being operative to estimate manufacturing costs. The cost estimates are based upon viable sequences of manufacturing operations for the designs and process-specific cost information regarding each manufacturing operation to be performed in the sequence. The system further includes software programmed to receive selected designs and selected design parameters from the input display and pass the selected designs and selected design parameters to the cost models. In addition, the system includes an output display operative to display the manufacturing costs estimated by the cost models for the selected designs and selected design parameters. In some embodiments, the materials can comprise advanced materials, the cost information can comprise industry standard information including information relating to labor hours for each operation, the cost models can comprise algorithms calculated from a plurality of discrete points, and the cost estimates can be categorized by families.

Another aspect of the present invention is a method for estimating the manufacturing costs for a part design. A part design is received. The manufacturing cost for the part is estimated using a process-oriented approach. Using this method, the cost impact for a part design can be assessed. The manufacturing cost for part design is estimated. The part design configuration, dimensions, and/or materials are varied to result in a new part design, for which the manufacturing costs are estimated. By repeating this step, one can determine the cost impact by varying the part design.

Yet another aspect of the present invention is the method for modeling the manufacturing costs for a part design. A cost model domain is determined. A database is generated of process oriented manufacturing cost estimates based upon at least material costs, a viable manufacturing sequence having a plurality of operations, and the costs per operation. The database of cost estimates are categorized in accordance with the model domain. One or more cost model algorithms are built based on the database of cost estimates wherein cost is a function of parametric values. One or more parametric values describing the part design is then determined. The parametric values are input to the one or more cost model algorithms. The manufacturing cost for the part design is then estimated based upon the results from the cost model algorithms.

In accordance with another embodiment, a method is provided for estimating the manufacturing costs for a part design. The method comprises generating a database of process-oriented manufacturing cost estimates based at least in part on: i) material costs, ii) a viable manufacturing sequence having a plurality of operations, and iii) the costs per operation. The method further comprises building one or more cost model algorithms based on the database of cost estimates, determining one or more parametric values describing the part design, and inputting the parametric values for the part design to the one or more cost model algorithms. In addition, this illustrative method comprises estimating the manufacturing costs for the part design based on the results from the cost model algorithms. In some embodiments, the method comprises determining a cost model domain by establishing the range of design variations, and categorizing the database of process-oriented manufacturing cost estimates in accordance with the domain. The materials can comprise advanced materials in some embodiments.

According to additional aspects, an inventive architecture and structure are provided comprising a software program coupled to a relational database suitable for implementing various types of cost models. These embodiments provide additional features and expanded capability, and this architecture is designed to be readily expandable and easily modified. Unlike other conventional cost modeling software, this architecture does not require additional logic to be written in software code and recompiled in order to add models for new cost elements or update cost models existing in the software. In addition, this architecture has the flexibility for implementing any type of cost model incorporating sets of algorithms associated with specific cost elements.

For example according to one aspect, a system for implementing a generalized cost model is provided comprising a computer system configured to execute cost estimation software, and a relational database configured for implementing a decision tree structure that enables identifying an appropriate set of equations and associated parameters for each element in a cost model. The computer system is configured to operate in at least one of the following configurations: an internet based system, an intranet based system, a client/server system, and as a single machine system. In this embodiment, a cost estimation software program is linked to the relational database and configured to access the database to utilize the equations to estimate cost based upon selections from a user. An interface is also provided for accessing the information in the database and is configured to allow for the identification of new cost elements and the inputting of corresponding equations and parameters, such that the cost model can be expanded without the need for modifying the logic of the software program and recompiling. The system can further comprise, in some embodiments, a user database to allow modifications while preserving the original database, a hierarchy manager to control navigation through the decision tree, a data manager to control flow of data to/from the database, and an equation builder to customize the equations for a specific user without modifying the program.

According to another aspect, a computer system is provided for cost estimation, comprising an interface layer for selecting one or more designs and one or more descriptive parameters which influence cost. The parameters comprise at least one of part dimensions, part weight, and descriptive parameters related to a cost element. The system further comprises one or more cost models operative to estimate costs and comprising algorithms calculated from a plurality of discrete points or parametric relationships between the descriptive parameters and an estimated cost. The cost models are based upon at least one of process-oriented manufacturing cost estimates, estimates utilizing industry standard and process-specific cost information, and historic costs associated with each manufacturing operation and/or cost element for other types of life cycle cost models. The system further comprises software programmed to receive the selected designs and the selected descriptive parameters from the interface layer and pass the selected designs and descriptive parameters to the cost models, and an output display operative to display cost estimates estimated by the cost models for the selected designs and selected descriptive parameters. In addition, the system of this embodiment includes an interface module configured to allow at least one of the software and cost models to interface with another software application so as to allow for input from the other software application and communication with the other software application. This system further includes an editing module operative to modify a database containing the algorithms and descriptive parameters. In some embodiments, an interface module can be provided to automatically update the algorithms when new data is available, and an editing module can be provided to allow modifications to the algorithms without requiring the software to be modified or re-compiled.

In accordance with another aspect, a method is provided for generating a cost model for use in estimating manufacturing costs. The method comprises determining a model domain by establishing the range of possible variations to be encompassed, the variations including variations in part features and variations in materials, the materials including advanced materials. The advanced materials are materials which lack historical manufacturing cost data for parts in the model domain. The method further comprises generating cost estimates by mapping the part features for each variation in the domain to their associated manufacturing processes, and evaluating the labor hours required for each of the manufacturing processes for each variation using industry standard estimation data. In addition, the method comprises categorizing the cost estimates into families according to the type of part, and building cost model equations, the cost model equations relating part features to cost. In some embodiments, the cost model equations can be modified or added to and/or can be automatically updated in response to new data. In other embodiments, the method can be applied for building a cost model for a cost element in the life cycle cost of a product, and the cost model equations can be derived through statistical analysis of data, such as historical costs or industry standard estimation data, to establish a relationship between cost and descriptive parameters associated with the cost element. The cost elements can be categorized into families by type in some embodiments.

Still other aspects of the present invention will become apparent to those skilled in the art from the following description of preferred embodiments, which are by way of illustration, the best modes contemplated for carrying out the invention. As will be realized, the invention is capable of other different aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings:

FIG. 1 illustrates a computer system to estimate the manufacturing costs for a part design;

FIGS. 11-12 illustrates screen shots from the MetCAPP software;

FIG. 13 depicts a cost element breakdown for a manual operation;

FIG. 14 depicts a report summarizing material and operation costs;

FIGS. 15-16 illustrate examples of databases of manufacturing;

FIGS. 18-20 depicts screen shots from a user interface;

FIG. 21 depicts a detailed cost output report;

DETAILED DESCRIPTION OF ILLUSTRATIVE EMBODIMENTS

Figure 2:
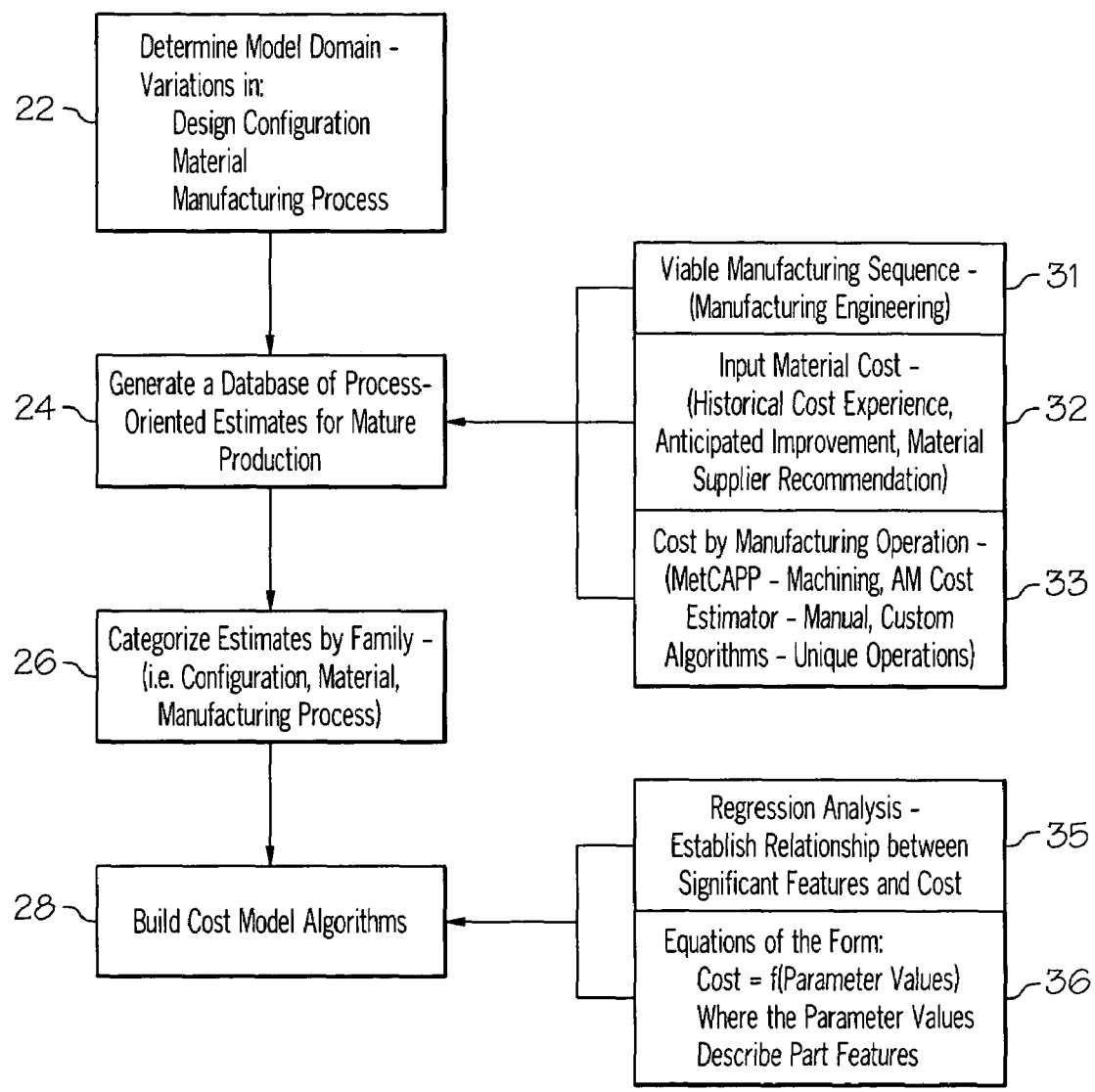
FIG. 2 illustrates one process for generating a cost model.

Reference will now be made to the present preferred embodiment of the invention, an example of which is illustrated in the accompanying drawings, wherein like numerals indicate the same element throughout the views. FIG. 1 illustrates one embodiment of a computer system 10 programmed to estimate the costs for a part design having advanced materials and/or processes using a process-oriented approach. As used herein, "advanced materials and/or processes" (which may also be referred to as "advanced hardware") refers to materials and processes used for manufacturing a part for which little or no historical manufacturing cost data is available in conjunction with that part. For instance, progressive, cutting edge and/or conceptual materials and/or processes which have yet to be used extensively, if at all, for manufacturing are considered "new" advanced materials and/or processes. Likewise, materials and that are old, but have not been extensively used in conjunction with a particular part are considered "old" advanced materials and/or processes. Advanced materials and processes are typically used in high technology applications (i.e. technology involving highly complex or specialized systems or devices), and are often used in conjunction with aerospace applications, such as aircraft engines. Nevertheless, advanced materials and processes can be implemented to manufacture any part. As used herein, "process-oriented" refers to a methodology based on a logical sequence of manufacturing steps.

The computer system 10 can be any conventional or special purpose computer, such as a desktop computer, a tower computer, a micro-computer, a mini-computer, server, workstation, palmtop computer, notebook computer, or the like. A computer readable medium (not explicitly shown) stores information readable by the computer system 10, such as programs, data files, etc. one with ordinary skill in the art will readily appreciate, a computer readable medium can take a variety of forms, including magnetic storage (such as hard drives, floppy diskettes, tape, etc.), optical storage (such as laser disks, compact disks, digital video disks "DVD", etc.), electronic storage (such as random access memory "RAM", read only memory "ROM", programmable read only memory "PROM", flash memory, memory sticks, etc.), and the like. Some types of computer readable media, which are sometimes described as being non-volatile, can retain data in the absence of power so that the information is available when power is restored.

The computer system 10 includes a cost model 16 developed for different designs employing a process-oriented approach for estimating manufacturing costs. The cost model 16 may be employed as discrete points stored in a database or converted into algorithms to predict or project the cost as a function of the physical parameters of part. Preferably, the cost model 16 is developed for a family of parts taking similarities in design, materials, and manufacturing techniques into consideration for defining the family. The cost model 16 translates part feature information from the design manufacturing cost based on operations required to produce the feature.

A software engine 14 implements the cost model 16, either as separate program modules or as an integral program module. The engine 14 is directed by an appropriate user interface 12, preferably tailored to the knowledge base of a design engineer using the program early in the design cycle, thereby enabling the design community to evaluate manufacturing cost while other design studies are underway. This is a desirable time for addressing affordability and producibility issues while the engineering team is evaluating various materials and design configurations to meet performance objectives. Accordingly, trade studies between alternate designs, materials and/or processes will be enhanced by considering their impact on manufacturing cost. Based on inputs from the user interface 12, the engine 14 references the cost model 16 to predict the cost of a design in various configurations utilizing advanced materials and/or processes. The modular structure of the computer system 10 facilitates updates to incorporate additional designs or advanced materials and/or processes for the subject part. Beyond this example, the computer system 10 can take alternative forms. For instance, the engine 14 can be made internet accessible by writing Active Server Pages (ASP) or Common Gateway Interface (CGI) where the user, remotely located, can access the program from the server, through internet/intranet and receive output/results in 'html' form.

While the cost model 16 can be generated in a variety of different ways, FIG. 2 illustrates one embodiment of a process 20 for generating a cost model, which in this example takes the form of a plurality of cost model algorithms. At step 22, a model domain is determined. This step establishes the range of possible variations to be covered by the cost model. These are variations that impact the cost of the part consisting of different configurations and designs, alternative materials, and possibly different methods of manufacturing the part. Designs that fall outside of the domain require a different set of cost algorithms for adequate assessment of manufacturing cost.

At step 24, a database of cost estimates is generated. Since little or no historical cost data is available for a part using advanced materials and/or processes, the cost model 16 is preferably derived from a set of discrete point estimates. These point estimates represent the variations identified in step 22. The estimates are created using a process-oriented approach by evaluating the labor or process hours required for each significant operation in the manufacturing process.

Therefore the manufacturing engineer at this step maps the part features into their associated manufacturing processes.

A variety of steps and variables are used to create the point estimates. As illustrated in the present example, at step 31 a viable sequence of operations for manufacturing the part as a production item is determined. This can comprise knowledge from manufacturing engineering, previous experience, and assumptions and expectations about advanced processes currently under development. At step 32, the type of input material and its form is established (i.e., cast, forged, fabricated from mill products, or a composite). The costs for advanced materials are projected based on previous experience, potential for cost reductions in the materials manufacturing process, and anticipated cost improvements identified by the advanced material supplier. At step 33, a cost estimate is calculated for each manufacturing operation using analysis tools, such as the MetCAPP software for machining operations and the American Machinist Cost Estimator algorithms and data for manual operations. For advanced processes, a custom algorithm can be developed from the limited data available and techniques such as Methods-Time-Measurement (MTM). This is accomplished by breaking down the manufacturing operation into cost elements that can be related to other operations or assessed from predetermined time standards. Predetermined time standards such as MTM assign a unit of time to each movement made by an operator during execution of one step in the manufacturing process.

Estimates are categorized by family at step 26. This enables a group technology approach that combines models for different parts. Each family is further subdivided into categories having the same manufacturing process to permit the models developed to be closely aligned with the designs to be estimated. For example, consider the components in aircraft engines. The family designation identifies a particular of aircraft engine component such as blade, vane, case, etc. Categories within a family are divided by the manufacturing process that depends on the type of material, (e.g., ceramic matrix composite, metal matrix composite). For the example given in FIG. 3, the family would be; "Outlet Guide Vane, Diffuse". The categories in steps 42 through 46 provide enough definition of the part to be estimated to allow selection of the appropriate cost model algorithms at the bottom of the decision tree structure.

At step 28, cost model algorithms are built. The equations in the cost model 16 relate specific part features to cost. These equations are derived through statistical curve fitting of the discrete point estimates. As illustrated by step 35, the form of the equation may be linear as developed using multi-linear regression analysis or non-linear, having an exponential form or a polynomial consisting of a power series. As illustrated by step 36, the resulting cost estimate may then be calculated as a function of parameters that describe the part features. A simple example of a single parameter non-linear equation to establish the relationship between cost and the size of the part as measured by the outside diameter has the following form:

$$Y = A * X^b \text{ where:}$$

A is a constant from regression analysis,

B is a constant from regression analysis,

X is the parameter (e.g., maximum outside diameter of the part to estimate), and Y is the estimated cost for the new part.

Figure 3:
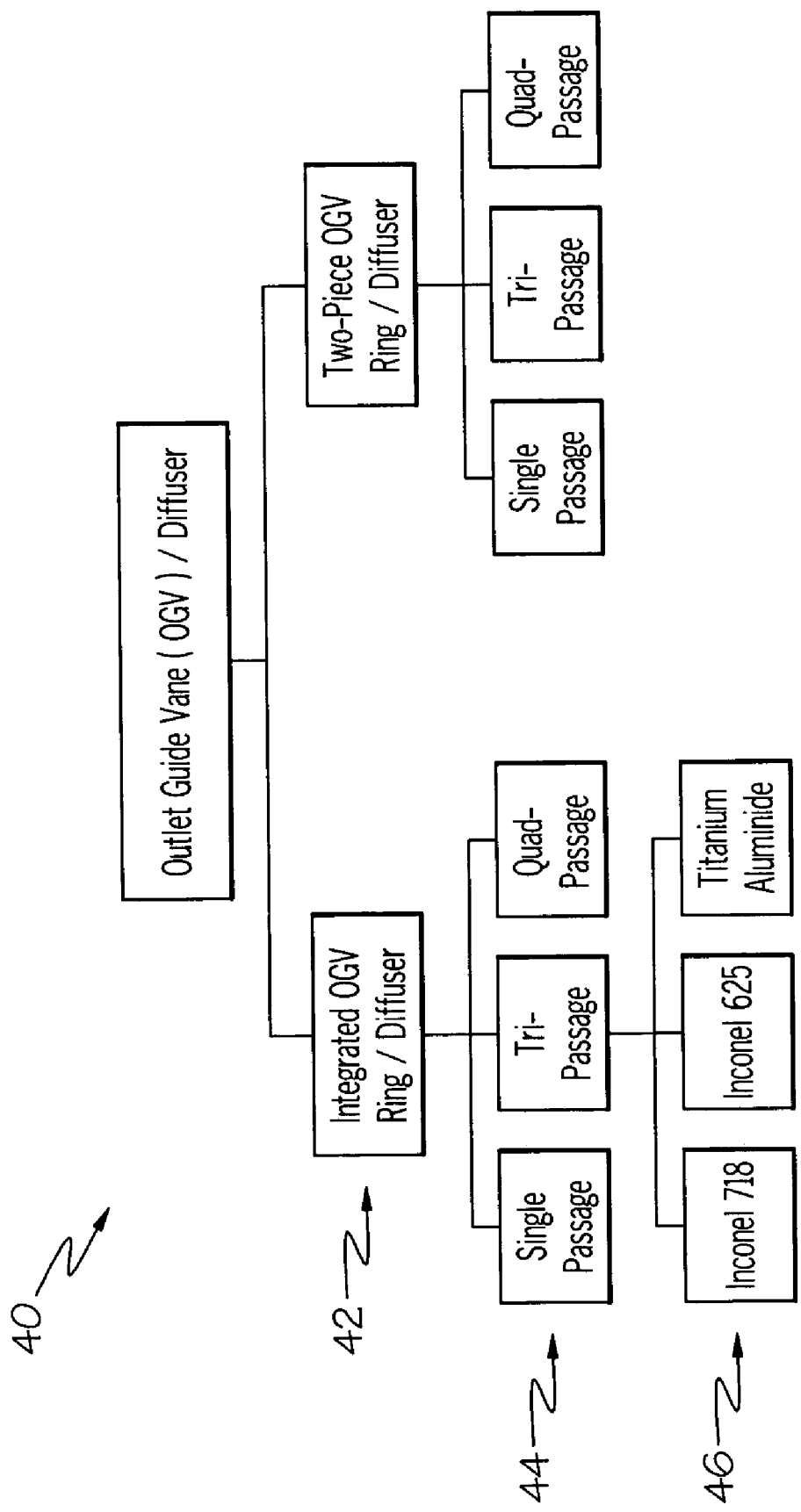
FIG. 3 illustrates an example of a model domain.
Figure 4:
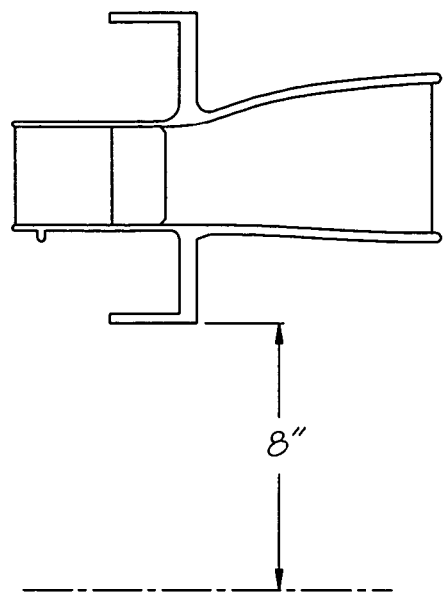
FIGS. 4-9 depicts six examples of design configurations.
Figure 7:
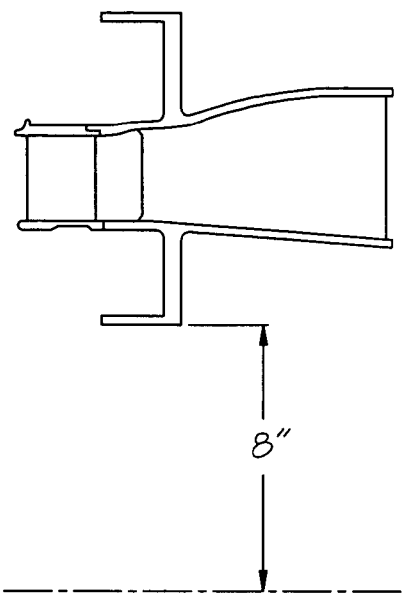
Figure 5:
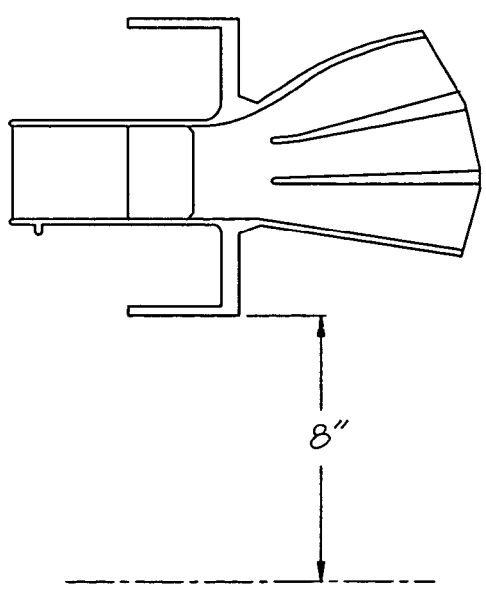
Figure 8:
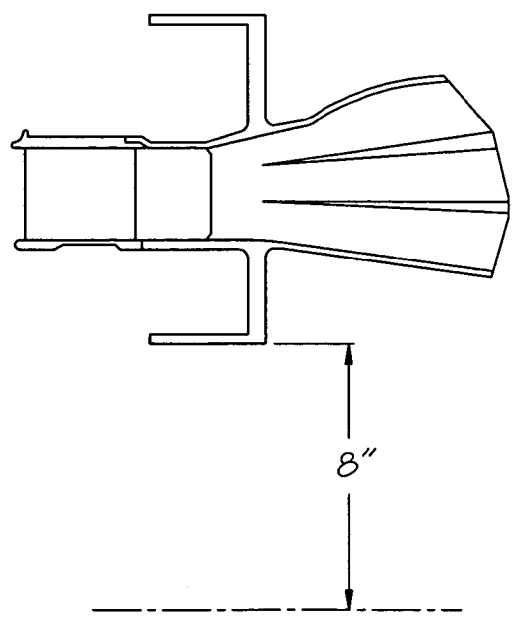
Figure 6:
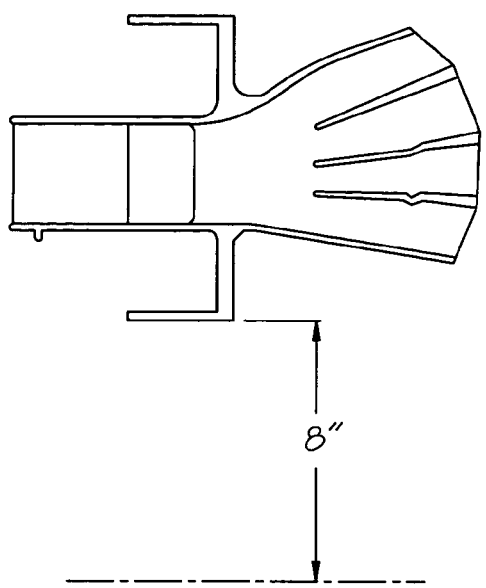
Figure 9:
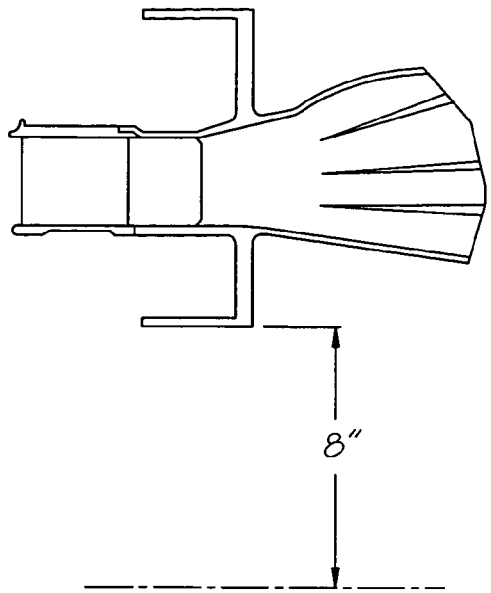

Consider the following example of generating a cost model 16 for a diffuser family in an aircraft engine. This example focuses on a hypothetical outlet guide vane (OGV)/diffuser. As illustrated in FIG. 3, a model domain 40 is defined by the various designs represented in 42 through 46 In this example, the model comprises two alternate design variations 42, each having three design configurations 44, and three material applications 46. While not explicitly shown, the three material applications 46 apply to each of the six design configurations 44 (i.e., three configurations 44 for the two design variations 42).

After the model domain is defined, process-oriented estimates are developed for a plurality of discrete points, which in this example comprises eighteen design (i.e., three material applications 46 for each of the six configurations 44). FIGS. 4-9 illustrate sketches of the six configurations 44 for which discrete cost estimates will be calculated. The material selection will not result in a change in the physical dimensions of the part for this example. Only the weight (finished and casting input) was adjusted as a function of material density for each discrete point. For each of the two design 42, the manufacturing process is similar. The parts that make up the OGV/diffuser assembly are made from an investment casting, finish turned, and assembled by welding or brazing. Therefore, no alternate manufacturing processes are considered in this cost model.

Figure 10:
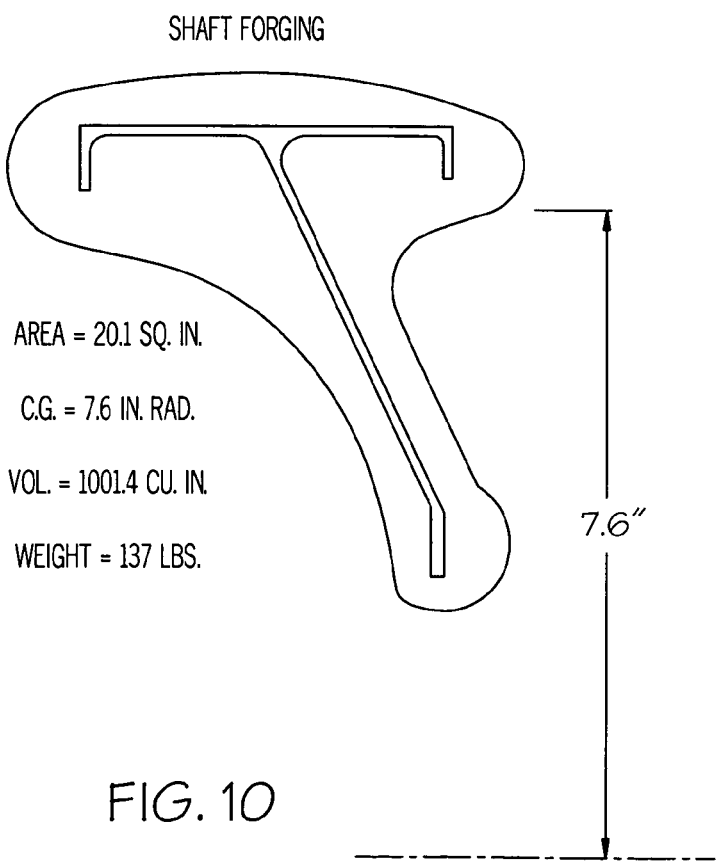
FIG. 10 depicts an example of a forging envelope.

The manufacturing cost for each configuration 44 of the two possible design 42 in the three material selections 46 (18 points) is estimated utilizing a process-oriented approach. A typical production casting material allowance is added for each configuration 44. Using an appropriate CAD tool, such as the AutoCAD system, the cross-section area for the finished part is measured and the center of gravity determined. From these values, the volume and weight of the casting and the finished part are calculated. As an example, FIG. 10 depicts a forging envelope and mass properties for the design shaft. The shaft is machined from a forging instead of a casting, however, except for the input material cost calculation, the same technique is used to estimate the cost of the manufacturing operations to finish the part. The input material cost for the castings is then estimated using any appropriate casting cost model. Preferably, the casting model calculates manufacturing cost for the castings as a function of the material selected, the pour weight of the casting, the price of the virgin ingot material, and a number of other casting process parameters.

The next step in the estimating process is to determine the sequence of manufacturing operations required in manufacturing the specific part and generating features, such as bolt holes, scallops in flanges, and the like. The process cost estimate for finishing the castings, which are assembled and welded or brazed together to complete the OGV ring/diffuse assembly is calculated, preferably utilizing a software tool such as the MetCAPP system. MetCAPP is a commercially available PC-compatible software program for "Knowledge-Based Process Planning" developed by the Institute of Advanced Manufacturing Sciences (IAMS). Embedded in the MetCAPP software is a comprehensive machining database known as CUTDATA which represents the industry standard database as published in the Machining Data Handbook. MetCAPP can used to estimate cost for machining operations and to generate the summary report for the process-oriented estimates.

Figure 12:
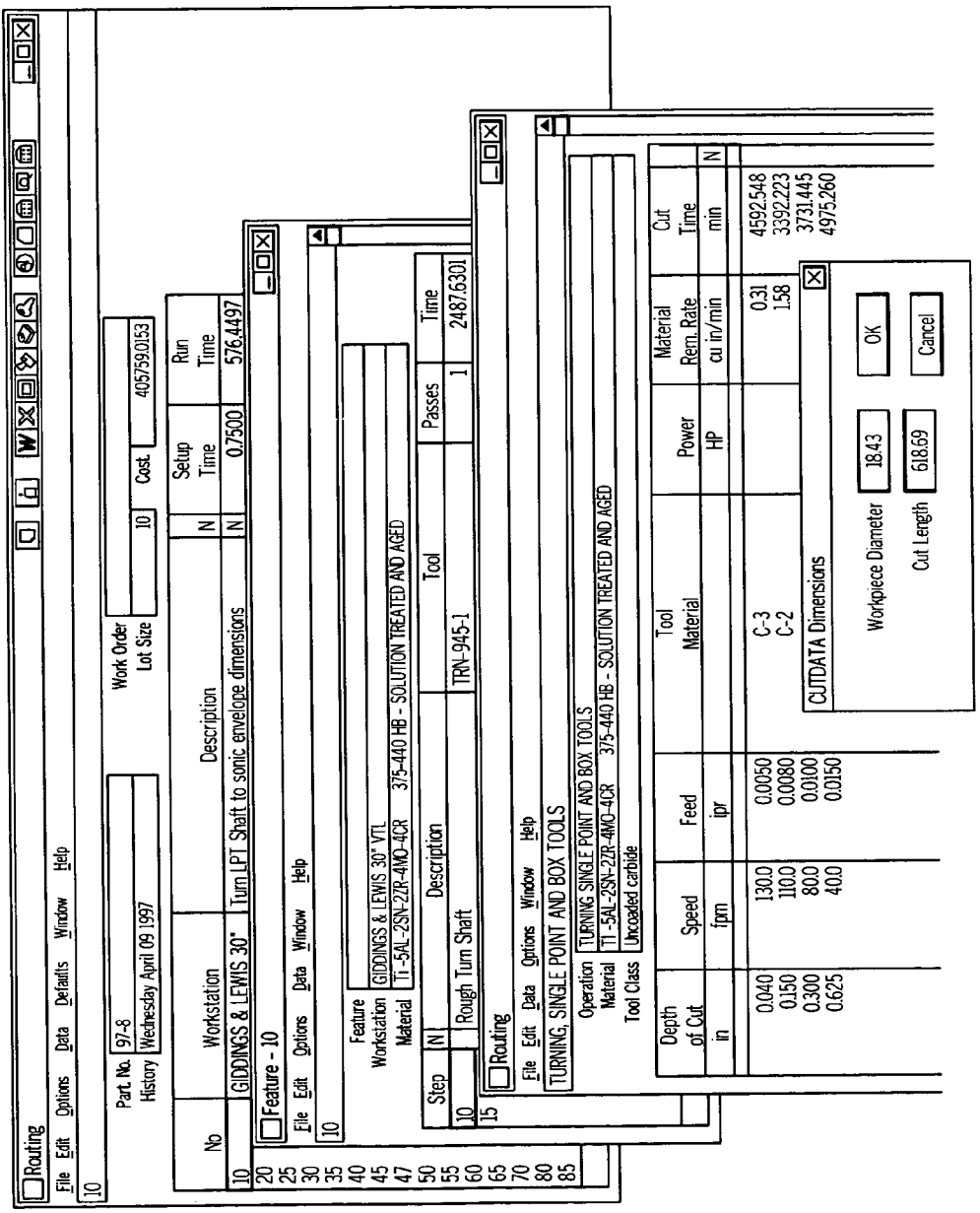

FIGS. 11 and 12 illustrate screen shots from the MetCAPP software. FIG. 11 depicts the estimated times for a sequence of manufacturing operations calculated by MetCAPP or input from other sources. A lot size of ten units is assumed to amortize the lot set-up time given in the first column after the operation description. Typically, MetCAPP time elements corresponding to the selected workstation for each operation provides this set-up time. The first operation (No. 10) is a turning operation based on the MetCAPP data as illustrated in FIG. 12. The cut time is calculated based on the input values for workpiece diameter and cut length. Cut length is a calculated value based on the depth of cut for the rough turning operation and the weight of material removed. The values for "Speed" in surface ft./min. and "Feed" in inches/rev. were based on information collected from industry sources with experience in machining TiAl.

Preferably, manual calculations or a manual operations software package other than MetCAPP issued to estimate times for manual operations such as cleaning, deburring, fixturing, brazing, and the like. For instance, the manual operations software can be a PC-compatible system having a cost estimating database consisting of labor estimating data and some process times. Further, the manual operations software preferably provides for estimating at a very detailed level, thus permitting an entirely new operation to be broken down into time elements for which data is available and then summed up to yield an estimate for the complete operation. The manufacturing operations can be totaled in the MetCAPP system even when the labor or processing time is based on another source.

Consider, for instance, the steps for the deburring operation depicted in FIG. 13. This elemental cost breakdown provides a basis for analyzing manual operations and new operations required for advanced technology materials and processes. When a software model is used to estimate the costs of such operations, the input and time required for generating a process-oriented estimate is minimized compared to manual estimations. For the present example of a deburring operation, the input parameters are reduced to: 1) maximum diameter to deburr, 2) number of diameters to deburr, and 3) part size (e.g., height, width, and length).

The steps outlined above are followed in similar fashion for each operation in the manufacturing sequence. The completed totals are then compiled to generate a report, such as that shown in FIG. 14. This output provides a summary of the material and labor cost used in the database summarized in FIGS. 15 and 16. FIG. 15 contains the points for the integrated OGV/diffuse assembly, and FIG. 16 contains the points for the two-piece, OGV ring/diffuse assembly.

A cost model 16 is then built from a process-oriented foundation using regression analysis techniques based on the eighteen points in the database. For each possible selection, the cost is assembled as a summation of the appropriate database values. The size associated with the design points is the nominal size of the parts, preferably allowing a variation from this nominal size (e.g., +/−20%) utilizing a power curve equation for diffuser cost as a function of diameter. A similar algorithm also adjusts the part weight as a function of the diameter. Accordingly, a process-oriented approach is used to generate a cost model 16 for a family of parts.

Figure 17:
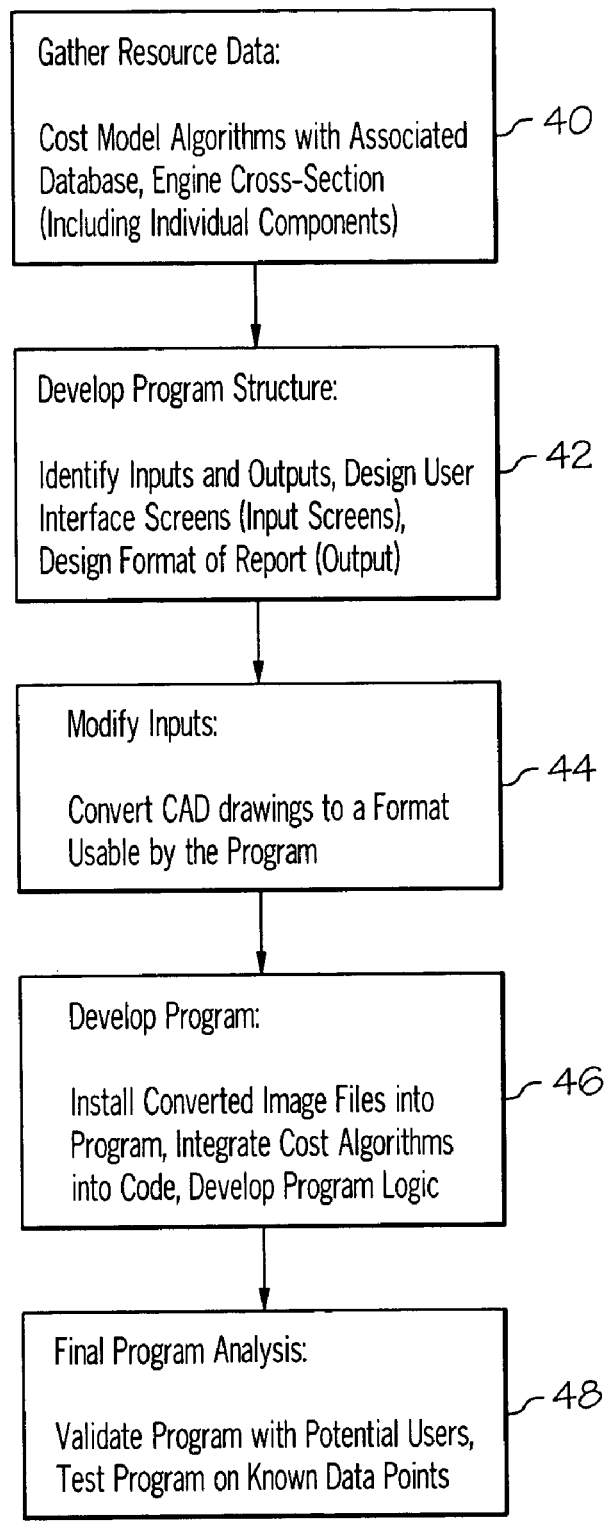
FIG. 17 depicts a flow chart for developing a software engine.

Returning to FIG. 1, the software engine 14 and corresponding user interface 12 can be made in any one of a variety of different ways. FIG. 17 illustrates one embodiment. At step 40, resource data is gathered, including input data such as the cost model algorithms, the associated database, CAD files for a complete engine and individual components. At step 42, the program structure is developed, including the internal data configuration (i.e., input and output variables), the user interface or input screens, and output formats and reports to generate. Next, at step 44 the input data is modified, such as converting CAD drawings to the program format. During step 46, the program is developed, which can be written in the Visual Basic, C++, or JAVA programming language, including installing the converted image files, integrating the cost model, developing program logic, and the like. At step 48, the program is validated with potential users and program results tested for known data points. The end result is a cost analysis tool in the form of a software program. This program combines a graphic user interface with input and output controls to allow a user to quickly generate an estimate of a new part.

By way of example, one embodiment of a computer system 10 will now be illustrated. In this example, the target user for this program is a preliminary or conceptual design engineer. This program will permit a designer to enter basic information regarding the specific design for a part in the OGV/diffuser family followed by values for physical parameters that impact the manufacturing cost of the part. The input parameters are those which are typically available in the initial stages of the design cycle.

Figure 18:
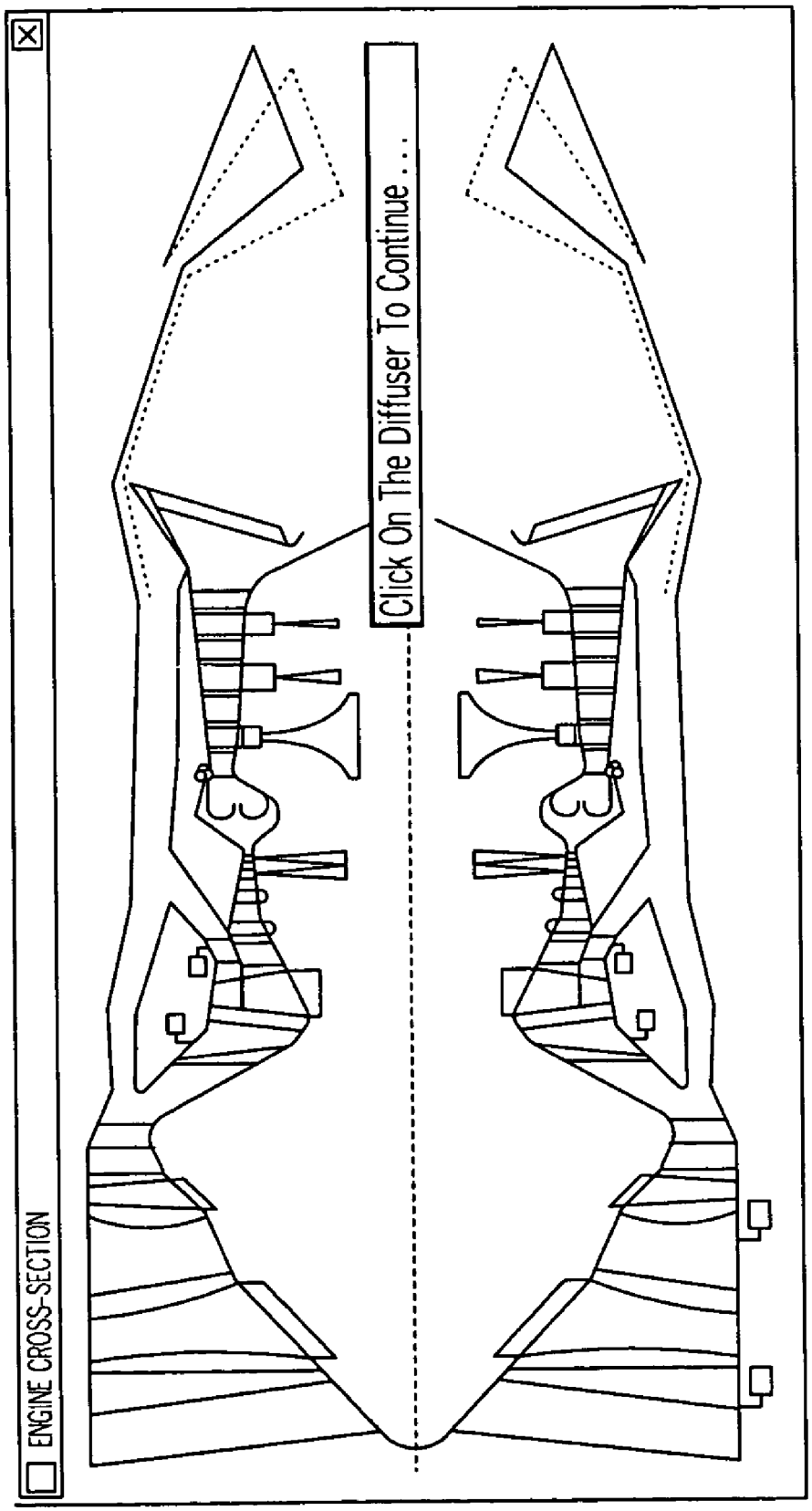
Figure 19:
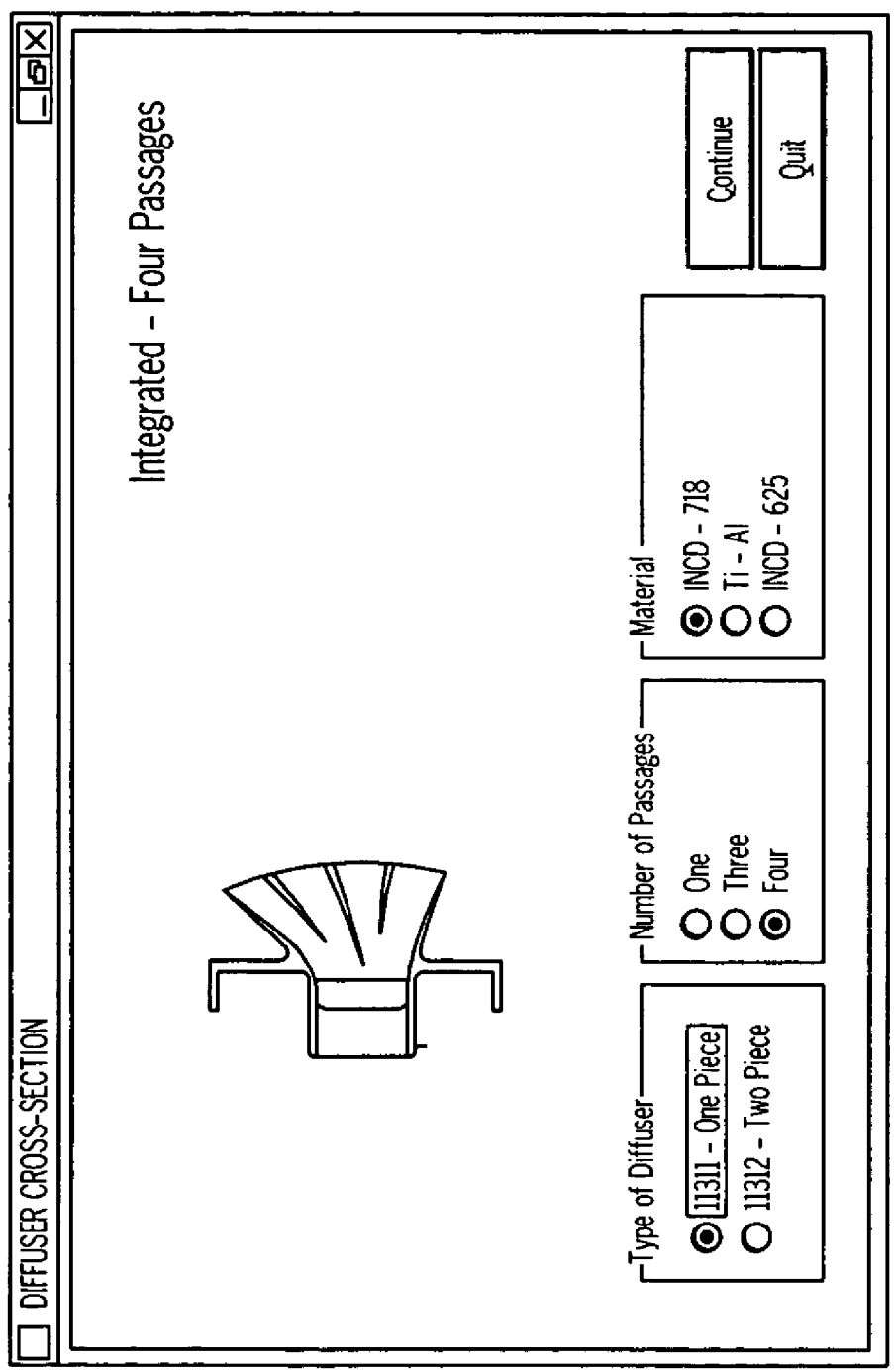

After an initial start-up screen, the program presents a sketch of the cross-section of an engine configuration, such as the screen shot depicted in FIG. 18. The parts or modules modeled in the program are highlighted. Color-coding is used to quickly identify individual items in the engine. For instance, the diffuser can be highlighted in red. This indicates that this sub-component is available for cost estimation. After selecting the OGV/diffuser part from the cross-section, the user makes appropriate choices to identify the nominal design point to estimate. The screen shown in FIG. 19 allows the user to identify the design variation, configuration and material for a part to be estimated. In this example, the design variation may be either a one-piece integrated OGV/diffuser assembly or a two-piece diffuser assembly with a separate OGV ring. To define the configuration, the number of passages in the diffuser (i.e., one, three, or four) is specified. As these selections are made, the sketch shown on this screen will update automatically to reflect the choices. Finally the material may be specified from three alternatives (IN-718, TiAl, or IN-625). These parameters enable manufacturing cost calculation from the appropriate algorithms.

Upon selection of the Continue button, the next input level is presented to the user wherein values for physical parameters are specified. As illustrated in FIG. 20, axial length, outer diameter and/or weight are three examples of such parameters. Beyond these three physical parameters, the interface could include a variety of other physical parameters. Preferably, each parameter is restricted to values within certain ranges on the domain established for the model.

Upon selection of the Calculate Mfg. Cost button, these parametric changes made by the user are passed to the various cost model algorithms. After the final manufacturing cost has been calculated, a user has the opportunity to print a cost detail report or view a simulation model of the manufacturing process, an example of which is illustrated in FIG. 21. The report identifies the design and configuration selected for estimation, lists the input parameters and gives a breakdown of the estimated cost.

Figure 22:
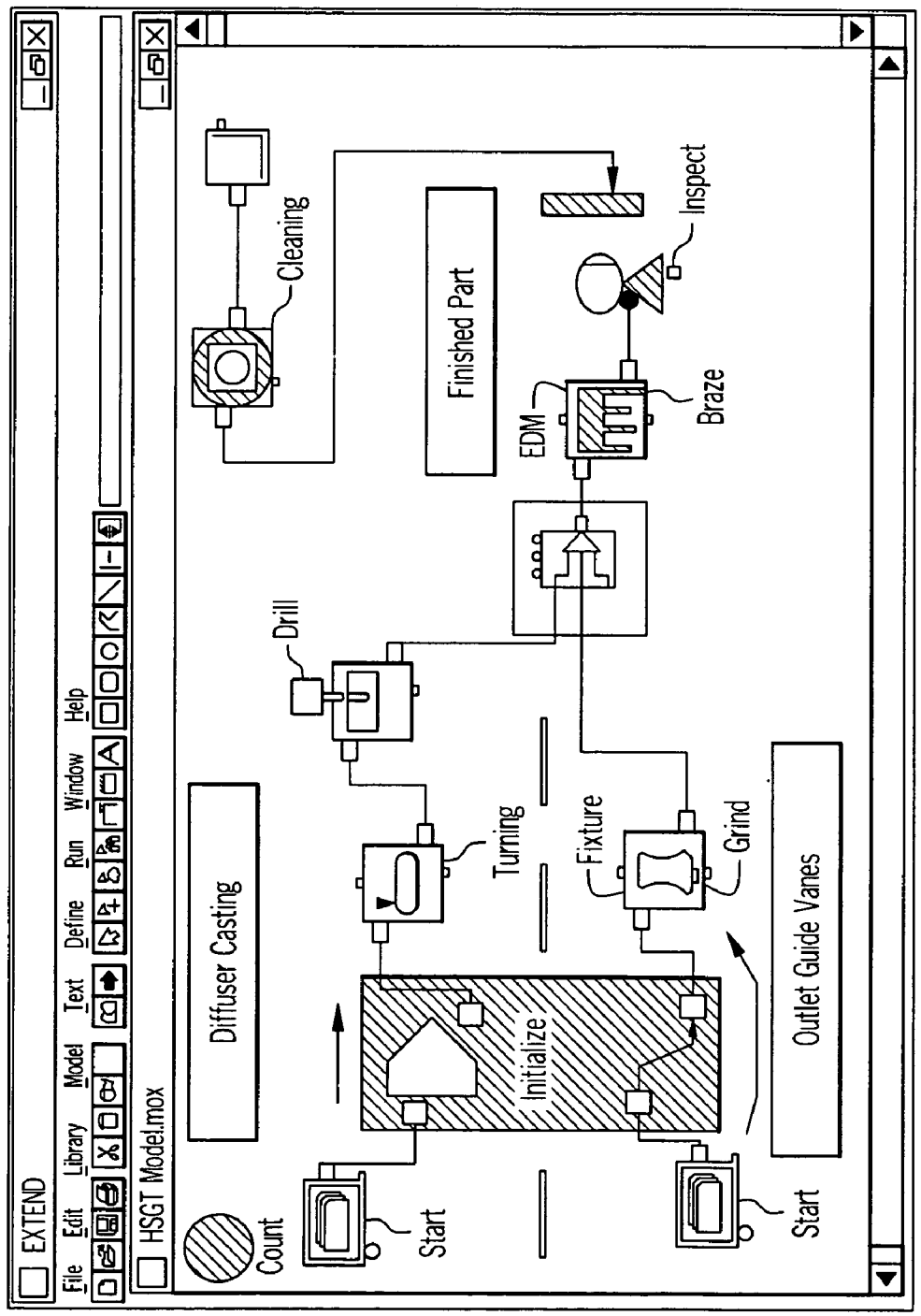
FIGS. 22-23 depicts screen shots from a manufacturing process flow simulation model.
Figure 23:
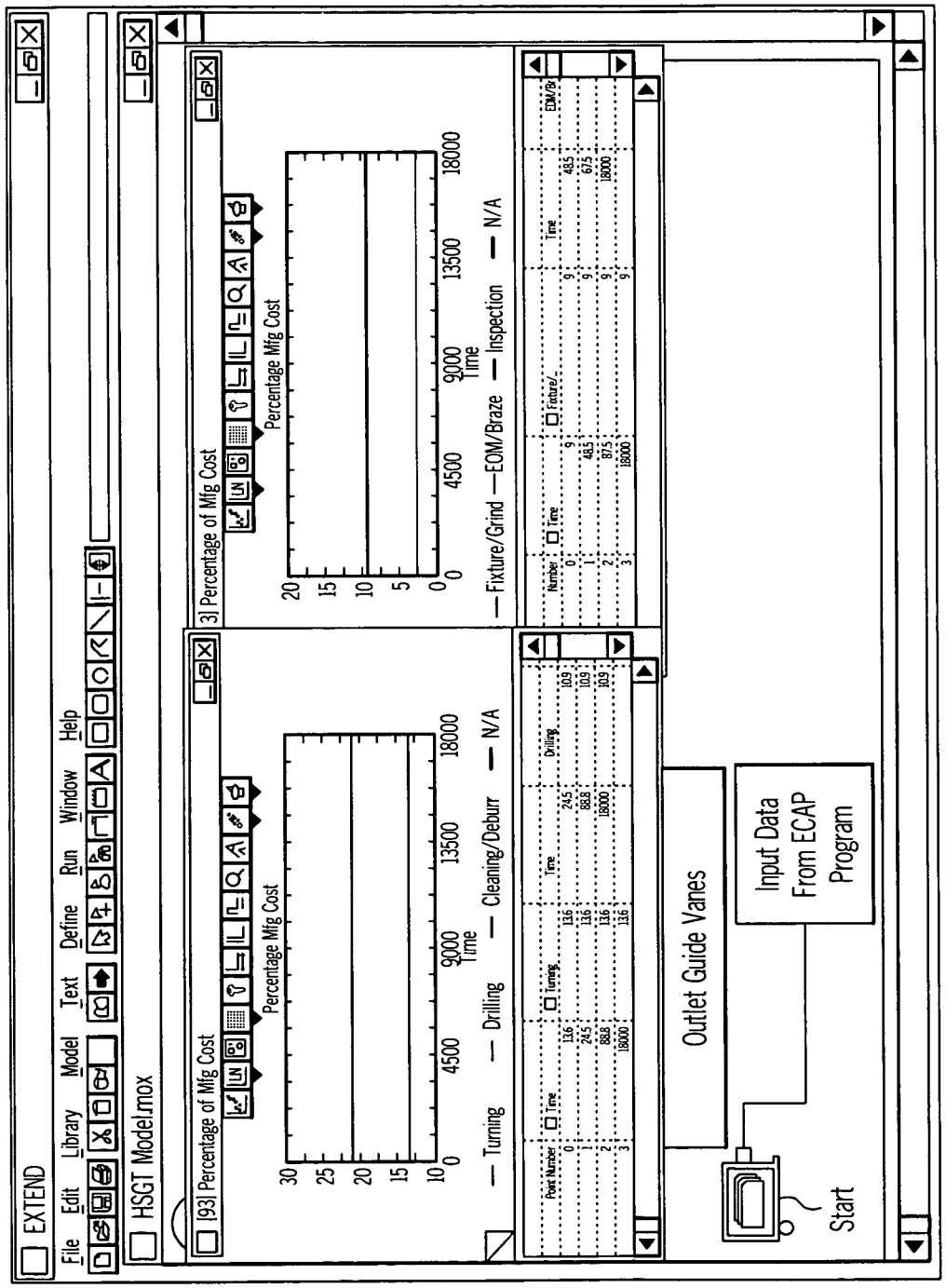

Upon selection of the Manufacturing Assembly button in FIG. 20, a simulation model is used to illustrate the manufacturing process for producing this particular sub-component. FIG. 22 illustrates an example of such a production process. A manufacturing process flow simulation "MPFS" is created in a simulation software program, such as the Extend Performance Modeling system from Imagine That Inc. and linked to the software engine 14. In the present example, the MPFS provides an illustration of the process flow for manufacturing the OGV/diffuser assembly. The simulation model highlights major cost drivers involved in the manufacturing process. It is especially suited to the preliminary design engineers who may not be familiar with the details of the manufacturing process for the part being designed. While the simulation model is running, input from engine 14 is read into the process blocks. A plot, such as that shown in FIG. 23, is then generated to show the percent contribution of each of the cost drivers identified in the process flow simulation model.

The engine 14 transfers the cost model 12 values directly into the simulation model. These are calculated values for the manufacturing cost of groups of operations as a percentage of the total estimated labor cost for the subject part. In the simulation model in FIG. 22, the individual operations are grouped into blocks representing the major cost drivers (e.g., turning, drilling, grind, etc.). These blocks are hierarchical in structure with underlying equations and logic for running calculations. As a result of the calculations, the percentages for the cost contribution of each of the major process cost drivers are determined and plotted, such as that illustrated in FIG. 23. After the simulation run is completed, closing the simulation model will cause the software to switch back to the user interface 12 for the engine 14.

The computer system 10 provides a unique software analysis tool for assessing the cost of conceptual designs using advanced materials and/or processes. This tool makes cost information available to a design engineer at a greater level of detail and earlier in the design cycle than ever before. Utilizing this information enables a designer to make decisions on alternative configurations, materials and even manufacturing processes.

The computer system 10 provides production costs based on the actual materials and designs envisioned for the product design. Furthermore, early producibility issues are addressed through real-time feedback on the proposed production process and identification of the cost drivers available in the MPFS module. For instance, using the computer system 10, we determined that the diffuser could be produced from two castings as a forward and aft section then joined by electron beam welding. In examining the casting process details, we projected that the integrated design could be cast in one piece with an acceptable yield and allowance for rework. However, the results of the cost analysis show that the integrated diffuser design is more expensive in each configuration than the two-piece design with a separate OGV ring. This is counterintuitive and in conflict with the general trend toward an integrated casting design for reducing manufacturing cost. This type of information is highly valuable, particularly to a preliminary/conceptual design engineer who is striving for a better understanding of the cost of his design and seeking to reduce production costs.

In conclusion, the method and system described above provides a tool for quickly estimating the production cost using advanced materials and/or processes. This approach provides the advantages of cost modeling and includes a variety of beneficial features. Cost estimates can be obtained quickly for a single part or a complete engine over a range of configurations, materials, and sizes. Input parameters are minimized to match the level of detail available to the preliminary designer. The estimates have a sound and a scientific basis. Vendor interaction further strengthens the fidelity of output. According to another aspect, from the process-oriented analysis, the sensitivity of the cost to changes in design becomes inherent in the cost model. Process details and assumptions are captured in the reference parts that make up the database. Manufacturing process constraints and producibility considerations have been taken into consideration in development of the cost model.

Figure 24:
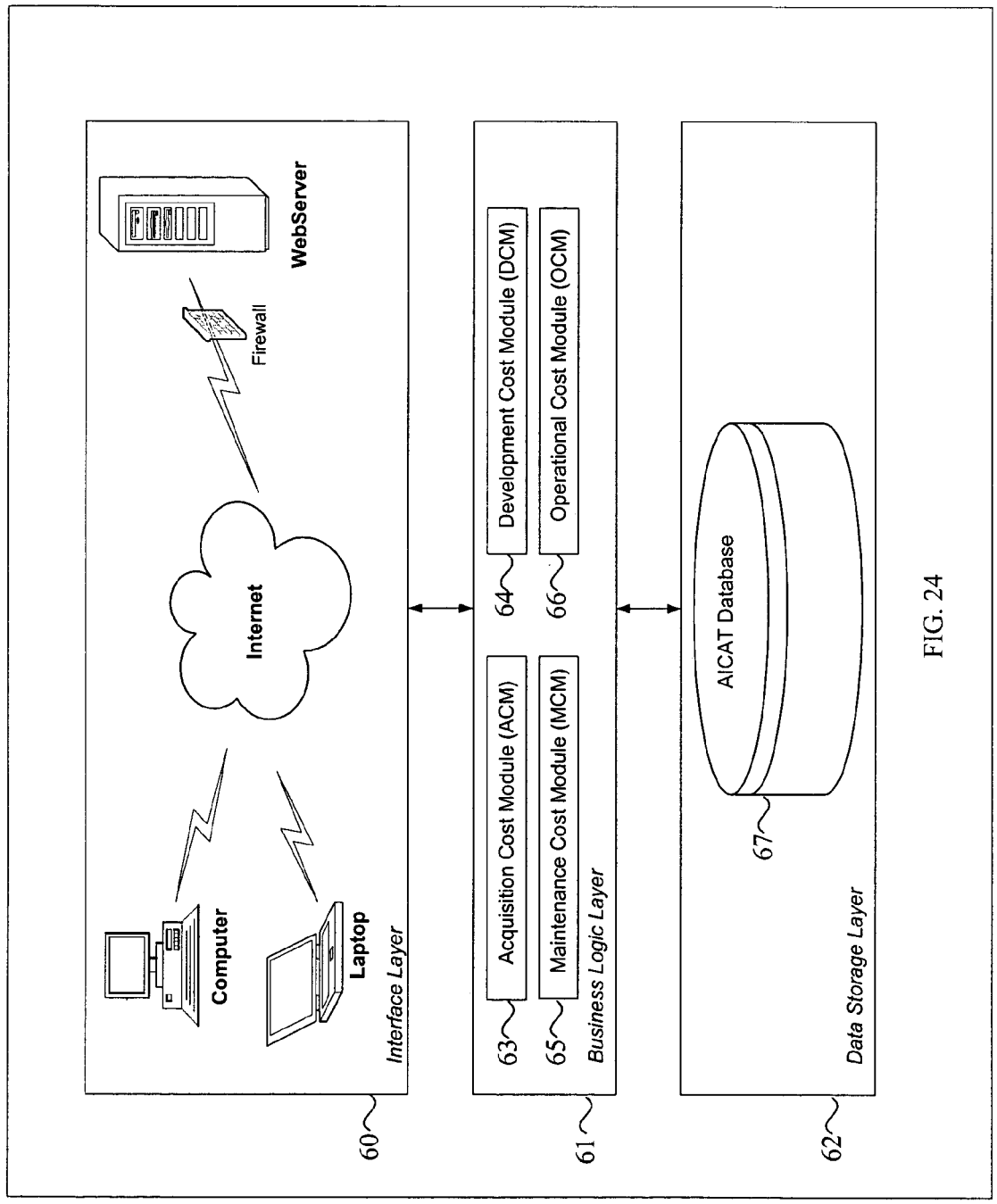
FIG. 24 illustrates an embodiment of cost estimation computer system architecture, made according to additional principles of the invention.

FIG. 24 illustrates an embodiment of cost estimation system architecture, made according to additional principles of the invention. This illustrative embodiment will be referred to herein as the Advanced Interactive Cost Assessment Tool (AICAT)™, which is an intuitive, highly adaptable and customizable architecture for implementing cost estimation applications. This tool employs a flexible architecture suitable for all elements of Life Cycle Cost (LCC) including acquisition cost. The foundation of AICAT lies in the software engine, fueled by algorithms developed by content creators. This tool is directed towards addressing the need of industry to project LCC during conceptual design. To make AICAT flexible, scalable and adaptable to users, the architecture is logically divided into three layers: Interface, Business Logic and Data Storage Layer in the example of FIG. 24. Each layer contains various software and hardware building blocks or modules which can be modified to fit different work environments, and make use of object oriented design principles.

The AICAT architecture of FIG. 24 is designed in such a way that the tool can be used in three different environments. First, AICAT may function as a web-based application whereby all the communication takes place over the Internet and the users' web-browser acts as the interface medium. The users can operate the software from their desktop(s) as long as they have an Internet connection and authorization from the web server. Second, an Intranet or client/server application may be addressed, where the communication takes place over the private network of an organization. In this setting, the Interface Layer can take the form of either an application running on the users' browser or a uniform, mouse driven, AICAT Graphical User Interface (GUI) application residing on an individual user's computer. The Business Logic Layer and Data Storage Layer can reside on the network server following client/server architecture principles.

To keep user data safe and confidential multiple levels of security can be implemented in both the web-based and client/server environments. The architecture allows for various security check points where each transaction is subject to authorization and scrutiny. This allows AICAT user(s) to be confident about the security of business sensitive data. The third type of implementation may be a stand-alone application that can run on a single computer loaded with the AICAT Graphical User Interface (GUI) and logical layers residing on an individual user's machine.

The Interface Layer (IL) 60 in FIG. 24, exclusively deals with communication between the user and the AICAT system. This layer accepts various commands from the user and takes care of the validation of the inputs. All the system outputs are displayed on the screen in various graphical, tabular or printable report formats. The IL is also responsible for communicating user commands and system responses back and forth from the lower layers.

The Business Logic Layer (BLL) 61 forms the backbone of AICAT. This layer is comprised of different costing modules—the modules that identify the Acquisition 63, Development 64, Maintenance 65 and Operational Costs 66—and is primarily responsible for handling the data and cost estimates. In addition the BLL communicates with the Interface and Data Storage Layers to accept and save input. The BLL also handles data processing and cost calculation in the modules it contains (FIG. 24). This unified approach allows users to conduct "What-if" analysis between alternatives within each module, as well as analyze the "Cause and Effect" relationships of various cost drivers from one module to another. The design allows the modules to work both independently and collectively.

The Data Storage Layer (DSL) 62 is responsible for storing and maintaining the data in various tables of the AICAT Database 67. The DSL feeds estimating equations and parametric data to the BLL from the database through query language. In order to save completed estimates, the BLL sends messages and data to the DSL, which performs the storing operation in the AICAT database 67.

Figure 25:
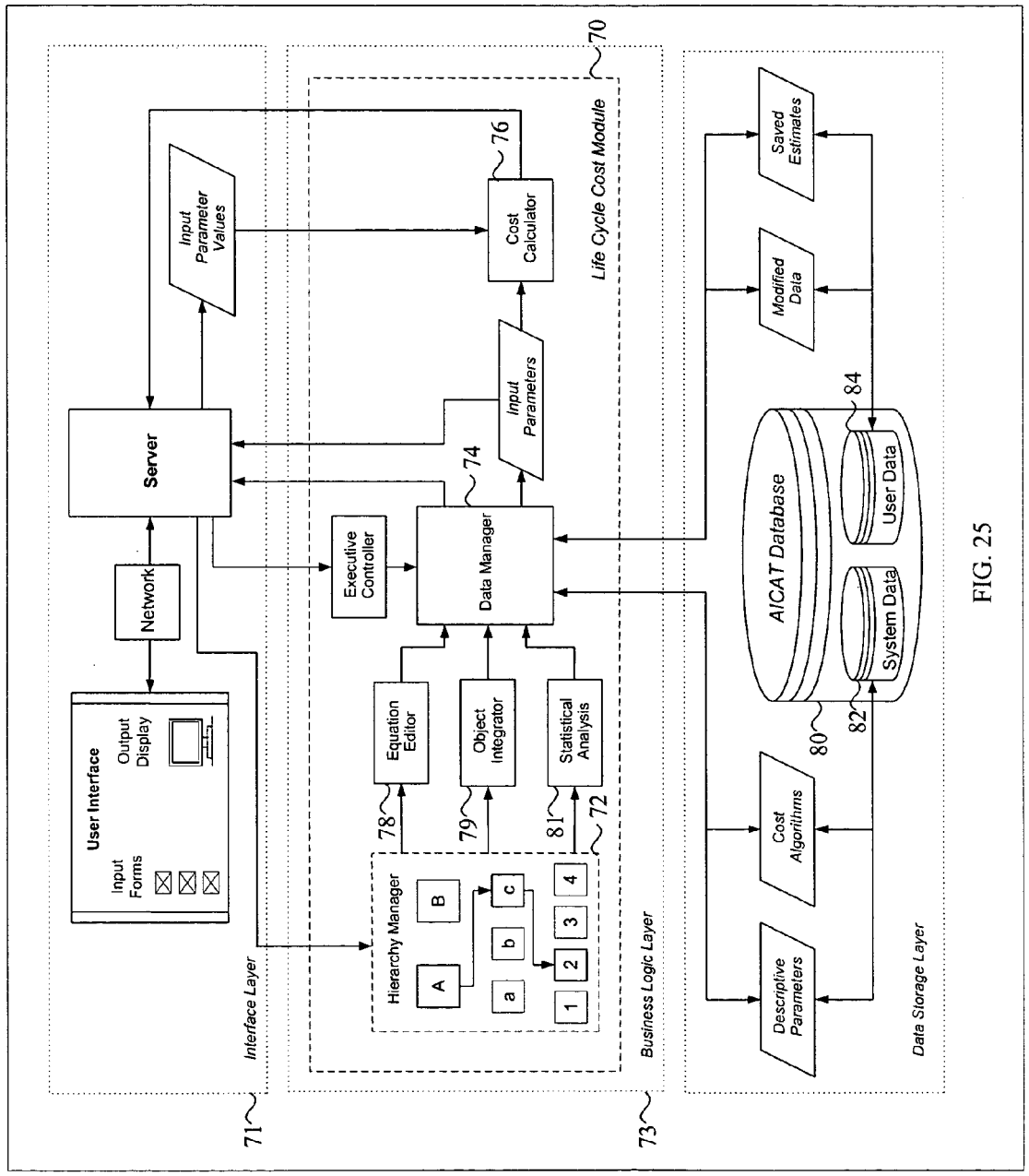
FIG. 25 depicts a more detailed view of the cost estimation architecture of FIG. 24.

The AICAT system operates by estimating costs for processes or cost elements associated with modules. In FIG. 25, the logic diagram of an AICAT LCC Module 70 included in the BLL 73, provides some details of the architecture common to all of the modules. The AICAT LCC Module 70 consists of multiple objects based on Object Oriented Programming (OOP) principles. The hierarchy manager module 72 contains logic for grouping the data in hierarchical fashion for optimal organization. The responses from the user communicated by the IL 71 identify the individual cost elements by browsing through a tree structure. The hierarchy manager is thus configured to control navigation through the decision tree in the database to identify the type of cost element to be estimated an to select the appropriate set of equations and parameters. In particular, an organized relational database 80 partitioned as system and user data, feeds information to the BLL 73. The system data partition 82 contains all the estimation and hierarchy rules. The user data partition 84 stores all the estimates generated by the user(s) as well as modifications and additions to the cost model algorithms, which an individual user may have created.

Once the cost element for estimating is recognized, the data manager module 74 extracts the attributes of the element from the system data partition 82 and the user is requested to input the parametric values of these attributes. These values are provided to the cost calculator 76, which calculates the estimate, based on the cost equations stored in the system data partition 82. The estimated cost is provided to the user via the IL 71. The user may then elect to print the estimate, save it in the user data partition 84, or modify and rerun the estimate. The data manager 74 is thus configured to control the flow information to and from the relational database 80, to assign locations for storing data in the database, to obtain a set of input parameters from the database for estimating a cost element, and to select a set of equations or cost algorithms from the database for generating an estimate.

This illustrative AICAT architecture includes several inventive aspects, including the capability of creating, modifying, and removing estimation rules (i.e. cost algorithms or equations) in either data partition through interaction with the database rather than implementing as code within the executable program. In particular, an editing feature is provided for modifying the database containing the selected cost elements and descriptive parameters so as to allow for updating and the addition of new cost elements. The design of the system allows the users to modify the cost equations if required through the equation editor module 78 without changing and compiling the program because the cost algorithms are contained in the database. Modifications and updates initiated by the AICAT user are stored in the user data 84 while the original equations and logic are preserved in the system data 82. In particular, the module 78 can be utilized to access the user data 84 to input new cost model data, so as to expand the domain of the model and customize the equations for a specific user without modifying the software program.

Figure 26:
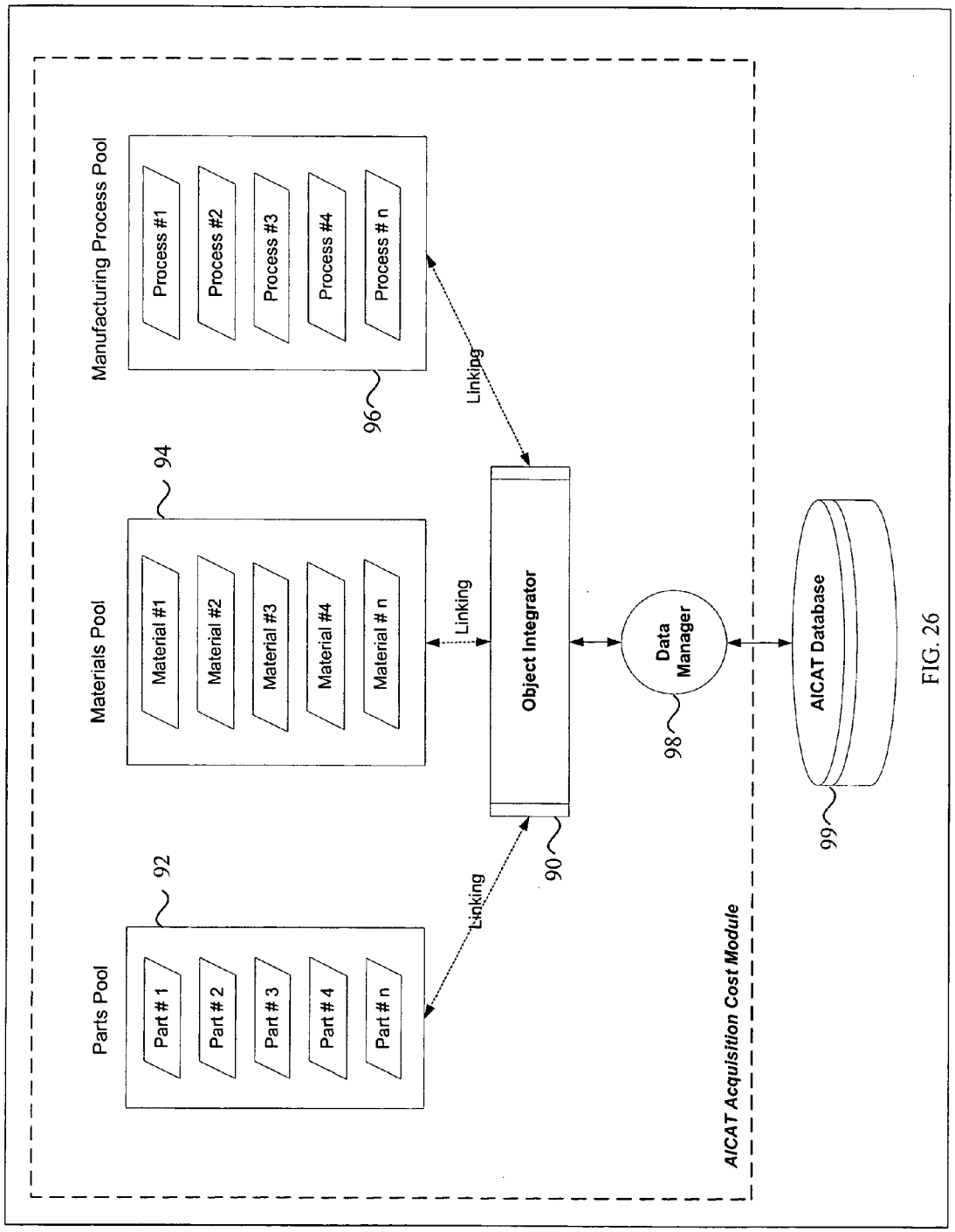
FIG. 26 depicts the acquisition cost module of FIGS. 24 and 25 in more detail.

An object integrator 79 allows the user to establish links between cost elements such as parts, materials and manufacturing processes. This functionality may be used to create a new branch in the tree structure. A new set of equations can then be developed and assigned to this branch using the equation editor 78. As shown in FIG. 26 cost elements in an Acquisition Cost Module can be logically represented as a parts pool 92, materials pool 94 and manufacturing process pool 96, identifying the possible parts, materials, and processes available in the model. Any desired combination of part, material, and applicable manufacturing processes can be combined and constructed by the object integrator 90. Once this combination is created, it is fed to the data manager 98 which verifies the combination and saves it in the AICAT database 99. This linkage identifies a unique set of cost algorithms for generating a cost estimate of the new part. Such features of the AICAT database 99 can provide a user-friendly environment for cost analysis and offer greater flexibility for updating. Using these features, the BLL can thereby provide the flexibility to add/change/delete any cost element (such as a material or process) and modify or create a new branch of the hierarchical tree structure.

The statistical analysis module 81 is capable of accessing the cost model to enable quick modifications to equations when new data becomes available. This feature can analyze user-specific data with calculated data from an existing cost rule (algorithm/equation) in the system data partition 82 (FIG. 25). The analysis can enable the creation of a new statistical cost rule or adjustment of an existing one. The results of this exercise may be saved in the user data partition 84. A user could exercise this capability if preliminary cost data such as actual labor hours or processing cost for a particular element becomes available. This would enable tailoring of the costs projected from the AICAT model to more precisely fit an individual user's cost.

Figure 27:
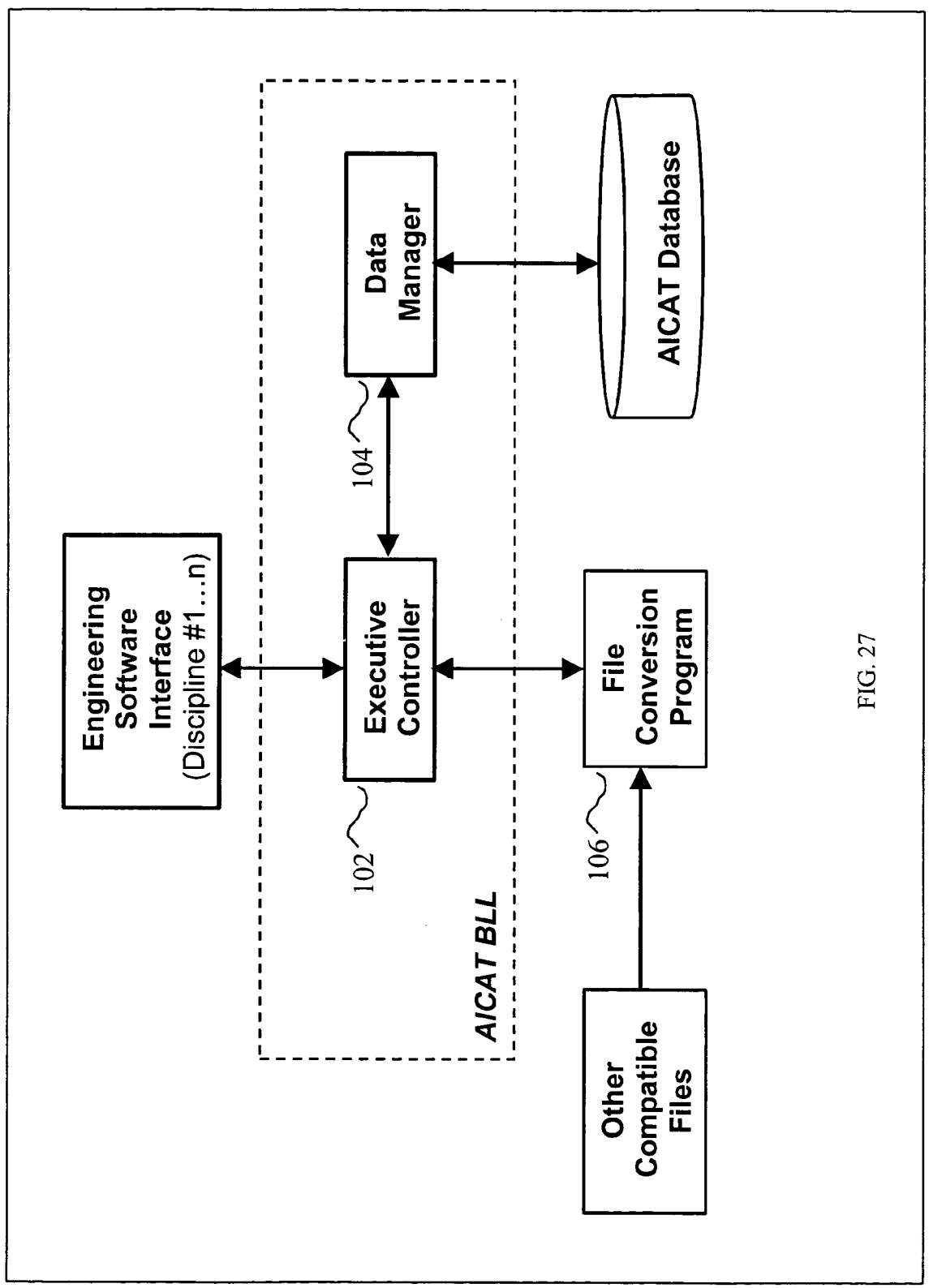
FIG. 27 illustrates additional features that can be provided with the exemplary cost estimation architecture of FIG. 24.

The BLL also provides the capability of configuring the modules or cost model to interface with another software application so as to allow for inputs and communication with the external application. This architecture greatly enhances the capability for utilizing the AICAT in a preliminary design environment dealing with rapidly evolving technologies. In particular, with reference to FIG. 27, capability can be provided to allow the executive controller module 102 to interface with other analysis programs, such as preliminary design software. One such design software application that may be interfaced provides an initial aircraft engine design based on the cycle specification. Typical output from such design software includes a cross-section of the flow-path, dimensions and features corresponding to the major parts, and identification of materials. The capability of the executive controller 102 to automatically accept output from such design software applications can streamline the process of inputting a new configuration of cost elements for estimating.

The BLL can also be provided with the capability for directly reading files generated by other programs. This can consist of logic to translate input parameters from the information provided by engine cycle design programs. Values may be selected from an existing output file or from a file generated especially for the AICAT file conversion program 106. Some adjustment or conversion of parameter values may be necessary to align with the input format and requirements. The file conversion program 106 can be utilized to request any additional information not available from the output of the external programs. Some parameters required by the executive controller 102 to feed into the data manager 104 such as the provision for attaching rotating parts together may not be available from the auxiliary design software. In this case the file conversion program 106 can be utilized to allow the user to quickly step through the part records generated automatically by the file conversion logic and fill in any missing values.

The generic structure of AICAT is adaptable to any type of cost modeling system for an LCC element. For example, in FIG. 24, the Development Cost Module (DCM) 64 is based on a hierarchical structure to enable analysis at various levels of detail, ranging from parametric algorithms at the macro level, to selection and evaluation of individual tasks such as specific tests for development hardware. The fundamental input to the system can be a time-line or development plan representing the duration and scheduling of each of the elements that make up the development cost modules. This schedule establishes the time frame for activities such as test, design engineering, hardware procurement, and manufacturing. From the schedule-input screens, the user can navigate to estimate the cost element represented by the time-line.

The DCM is also implemented using the Life Cycle Cost Module 70 architecture illustrated in FIG. 25. The data manager 74 extracts the cost equations for the development module from the system data partition 82 and provides them to the cost calculator 76 which calculates the cost based on the time-line and user inputs for the associated descriptive parameters. The user may input or modify cost-equations for the DCM through the equation editor 78 and object integrator 79 in the BLL 73.

In summary, the AICAT architecture in the example of FIG. 24 provides the following new features and capabilities in addition to the functionality of the previous Component Cost Assessment Program example illustrated in FIG. 1:

1. utilities and/or modules to enable the user to make the following updates without recompiling the software:
   A. adding a new material to the database,
   B. modifying or adding algorithms for estimating cost specific to a cost element or its constituent sub-elements, and
   C. adding new cost elements to the model (e.g. hardware for the ACM or tests for DCM).
2. Statistical analysis capability to access the cost model equations to enable quick updates when new data becomes available,
3. link-up and control of AICAT from other analysis software such as from preliminary design software, and
4. the capability of accepting and converting data from external sources such as other preliminary design analysis software.

The above illustrative embodiments depicting various aspects of the invention can be implemented using a wide variety of programs, protocols, and data configurations. Moreover, as can be understood, the methods, systems and functions described herein can be implemented in computer executable instructions, routines, sections of code, software components or modules, programs, or the like, which operate via one or more processors, controllers, computational devices, or appropriate hardware components. Any of a variety of software or programming languages can be utilized for this purpose. Moreover, the data and programmed methods and modules referred to herein may be stored on any suitable storage medium, such as on hard disk drives, CD-ROM drives, backup storage devices, or other memory devices, such as suitable non-volatile optical, magnetic, or electronic memory devices. Furthermore, a variety of suitable types of computing devices could be utilized to implement the methods and systems described herein, including computers, data processors, or other devices having appropriate circuitry or hardware connected in an appropriate manner for use for the described functions.

Accordingly, the foregoing description of the illustrative embodiments has been presented for purposes of illustration and description of the various aspects of the inventions. It is not intended to be exhaustive or to limit the inventions to the precise forms disclosed, and modifications and variations are possible in light of the above teachings. For example, although a number of methods, systems, operations, and configurations have been described in the illustrative embodiments, it is to be understood that additional or alternative methods, systems, orders of operation and configurations could be used without departing from the scope of the inventions. Moreover, although various aspects of the inventions have been illustrated, these aspects need not be utilized in combination. Likewise, the principles of the present invention are applicable to a number of cost estimation programs and techniques.

Thus, the foregoing description of the preferred embodiments, which show aspects of the invention, has been presented for purposes of illustration and description. These embodiments are not intended to be exhaustive nor to limit the invention to the precise forms disclosed. Many alternatives, modifications, inventive aspects, and variations will be apparent to those skilled in the art in light of the above teaching. Accordingly, it is intended to embrace all alternatives, modifications, inventive aspects, and variations that fall within the spirit and broad scope of the claims.

What is claimed is:

1. A computer system for cost estimation, comprising:
   an interface layer for selecting one or more designs and one or more descriptive parameters which influence cost, wherein said parameters comprise at least one of part dimensions, part weight, and descriptive parameters related to a cost element;
   one or more cost models operative to estimate costs and comprising algorithms calculated from a plurality of discrete points or parametric relationships between the descriptive parameters and an estimated cost, said cost models being based upon at least one of process-oriented manufacturing cost estimates, estimates utilizing industry standard and process-specific cost information, and historic costs associated with each manufacturing operation and/or cost element for other types of life cycle cost models;
   software programmed to receive the selected designs and the selected descriptive parameters from the interface layer and pass the selected designs and descriptive parameters to the cost models;
   an output display operative to display cost estimates estimated by the cost models for the selected designs and selected descriptive parameters;
   an interface module configured to allow at least one of the software and cost models to interface with another software application so as to allow for input from said other software application and communication with said other software application; and
   an editing module operative to modify a database containing the algorithms and descriptive parameters.

2. The system as recited in claim 1, wherein each module comprises software code, the system further comprising:
   an interface module operative to access the cost model and provide automatic updates and modifications to algorithms of the cost model when new data becomes available; and an editing module operative to modify the algorithms within the cost model, so as to allow for the addition of new designs, materials, and parameters without requiring modifications or re-compilation of the software.

3. A system for implementing a generalized cost model comprising:
- a computer system configured to execute cost estimation software, wherein the computer system is configured to operate in at least one of the following configurations: an internet based system, an intranet based system, a client/server system, and as a single machine system;
- a relational database configured for implementing a decision tree structure that enables identifying an appropriate set of equations and associated parameters for each element in a cost model;
- a cost estimation software program linked to the relational database and configured to access the database to utilize the equations to estimate cost based upon selections from a user; and
- an interface for accessing the information in the database and configured to allow for the identification of new cost elements and the inputting of corresponding equations and parameters such that the cost model can be expanded without the need for modifying the logic of the software program and recompiling;
- wherein, the computer system executes the cost estimation software program.

4. The system as recited in claim 3, further comprising a user database configured to allow the user to modify the cost model by adding new algorithms and parameters which are stored in the user database while preserving the relational database.

5. The system as recited in claim 3, further comprising a hierarchy manager configured to control navigation through the decision tree in the relational database to identify the type of cost element to be estimated and select the appropriate set of equations and parameters.

6. The system as recited in claim 3, further comprising a data manager configured to control the flow of information to and from the relational database, to assign locations for storing data, to obtain a set of input parameters from the database for estimating a cost element, and to select a set of equations or cost algorithms from the database for generating an estimate.

7. The system as recited in claim 3, further comprising an equation builder configured to access the relational database for inputting new cost model data to expand the domain of the model and customize the equations for a specific user without modifying the software program.

* * * * *